United States Patent
Sevindik et al.

(10) Patent No.: US 10,999,844 B2
(45) Date of Patent: May 4, 2021

(54) METHODS AND APPARATUS FOR ALLOCATING AND/OR USING PARTIAL AND BULK SPECTRUM IN A CITIZENS BROADBAND RADIO SERVICE (CBRS) NETWORK

(71) Applicant: Charter Communications Operating, LLC, St. Louis, MO (US)

(72) Inventors: Volkan Sevindik, Parker, CO (US); Haider Syed, Parker, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 28 days.

(21) Appl. No.: 16/178,513

(22) Filed: Nov. 1, 2018

(65) Prior Publication Data
US 2020/0146008 A1  May 7, 2020

(51) Int. Cl.
*H04W 72/04* (2009.01)
*H04W 76/15* (2018.01)
*H04W 88/02* (2009.01)

(52) U.S. Cl.
CPC ....... *H04W 72/0453* (2013.01); *H04W 76/15* (2018.02); *H04W 88/02* (2013.01)

(58) Field of Classification Search
CPC ............................................... H04W 72/0453
See application file for complete search history.

(56) References Cited

U.S. PATENT DOCUMENTS

| | | | | |
|---|---|---|---|---|
| 2009/0059856 A1* | 3/2009 | Kermoal | ............... | H04W 16/14 370/329 |
| 2012/0257530 A1* | 10/2012 | Bijwaard | .......... | H04W 72/1231 370/252 |
| 2018/0124792 A1* | 5/2018 | Khoshnevisan | ..... | H04B 17/345 |
| 2019/0059000 A1* | 2/2019 | Sun | ........................ | H04W 16/14 |
| 2019/0174359 A1* | 6/2019 | Hannan | ................. | H04W 16/10 |

* cited by examiner

*Primary Examiner* — Kevin M Cunningham
(74) *Attorney, Agent, or Firm* — Straub & Straub; Michael P. Straub; Stephen T. Straub

(57) ABSTRACT

A first citizens broadband radio service device (CBSD), which is part of a first cluster of CBSDs, determines total needed spectrum for the first cluster, based on a determination of its own spectrum needs and received information from other CBSDs in the cluster communicating their determined spectrum needs. The first CBSD communications the total spectrum needs for the first cluster to a spectrum access system (SAS). The first CSBD receives a spectrum allocation for the first cluster from the SAS, which allocates spectrum on a per cluster basis. The first CSBD selects a first portion of spectrum for itself from the received allocation and communicates the SAS first cluster spectrum allocation and the first CSBD selected first portion of spectrum to a second CBSD in the cluster. The second CBSD determines the remaining spectrum of the SAS allocation and selects a second portion of spectrum from remaining spectrum for itself.

10 Claims, 21 Drawing Sheets

| FIGURE 8A | FIGURE 8B | FIGURE 8C |

| FIGURE 9A | FIGURE 9B | FIGURE 9C |

US 10,999,844 B2

METHODS AND APPARATUS FOR ALLOCATING AND/OR USING PARTIAL AND BULK SPECTRUM IN A CITIZENS BROADBAND RADIO SERVICE (CBRS) NETWORK

FIELD

The present application relates to methods and apparatus for requesting, allocating, and/or using spectrum in a wireless communications system, and more particularly, to efficiently requesting, allocating and/or using bulk spectrum and/or spectrum portions in a CBRS network.

BACKGROUND OF THE INVENTION

In a Citizens Broadband Radio Service (CBRS) network, Citizens Broadband Radio Service Devices (CBSDs) serve as access points which can support wireless communications with user equipment devices (UEs).

A CBRS network often includes one or more Citizens Broadband Radio Service Devices (CBSDs) with relatively small coverage areas as compared to a macro base station or access point. The CBSDs are used to provide services to subscribers' user equipment devices. Spectrum is granted to each of the CBSDs using a centralized system called the Spectrum Access System (SAS). The Spectrum Access System is a central processing and database system that receives and processes spectrum grant requests. One of the important objectives of the FCC is to utilize the available frequency spectrum in the CBRS network as efficiently and effectively as possible.

In a typical CBRS network, Spectrum Access System (SAS) assigns spectrum to each individual CBSD. An issue with this approach is that a CBSD which has been assigned a particular amount of spectrum might not have enough data to utilize this spectrum with a high percentage. For example, if a CBSD is assigned a particular amount of spectrum, e.g., 10 MHz of spectrum, that device might not have enough users to utilize all of the 10 MHz spectrum. This can lead to under-utilized network resources. Current CBSDs in CBRS networks have low total utilization of the assigned spectrum. The total amount of wasted spectrum increases with increasing number of under-utilized spectrum.

One approach to more efficiently utilizing spectrum is to increase the frequency of the resource allocation related signaling, e.g., requests and allocations, between each CBSD and SAS. However, this results in higher control signaling overhead between the CBSD and SAS and may become impractical for CBRS systems where there are a very large number of CBSDs.

Based on the above discussions, there is a need for new methods and apparatus for efficiently allocating spectrum in a CBRS network and/or reducing under-utilization of available spectrum. It would be beneficial if at least some of these new methods and apparatus required relatively low amounts of spectrum allocation related control signaling between CBSDs and the SAS. It would also be advantageous if at least some of these new methods and apparatus supported efficient spectrum allocation for supporting large numbers of CBSDs and/or were flexible to accommodate expanding systems with increasing numbers of CBSDs.

SUMMARY

Exemplary methods and apparatus for efficiently allocating spectrum in a CBRS network are described. CBSDs are grouped into clusters, each cluster including multiple CBSDs. The CBSDs of a cluster determine the spectrum needs of the cluster, and one CBSD within the cluster communicates the spectrum needs of the cluster to the SAS. Each cluster of CBSDs communicates its cluster spectrum needs to an SAS. Spectrum need is analyzed per cluster of CBSDs by the SAS. The SAS communicates a spectrum allocation for a particular cluster to one CBSD within the cluster, which receives the cluster spectrum allocation for the cluster. The received spectrum allocation for the cluster is distributed among the CBSDs of the cluster, e.g., via communications and coordination within the cluster.

An exemplary method of operating a first citizens broadband radio service (CBRS) device (CBSD), in accordance with some embodiments, comprises: communicating to a spectrum access system (SAS) information indicating current spectrum needed for a first cluster of CBSDs, said first cluster of CBSDs including multiple CBSDs, said first CBSD being one of the CBSDs in said first cluster; receiving from the SAS a spectrum allocation, said spectrum allocation being an allocation of spectrum assigned to the first cluster; and using a first portion of the spectrum allocated to the first cluster of CBSDs to communicate with user equipment (UE) devices serviced by the first CBSD.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE FIGURES

FIG. 6 comprises the combination of FIG. 6A, FIG. 6B and FIG. 6C.

FIG. 4 illustrates details of an exemplary Citizens Broadband Radio Service Device (CBSD) in accordance with one embodiment of the present invention.

DETAILED DESCRIPTION

Figures 1, 1A, 1B:
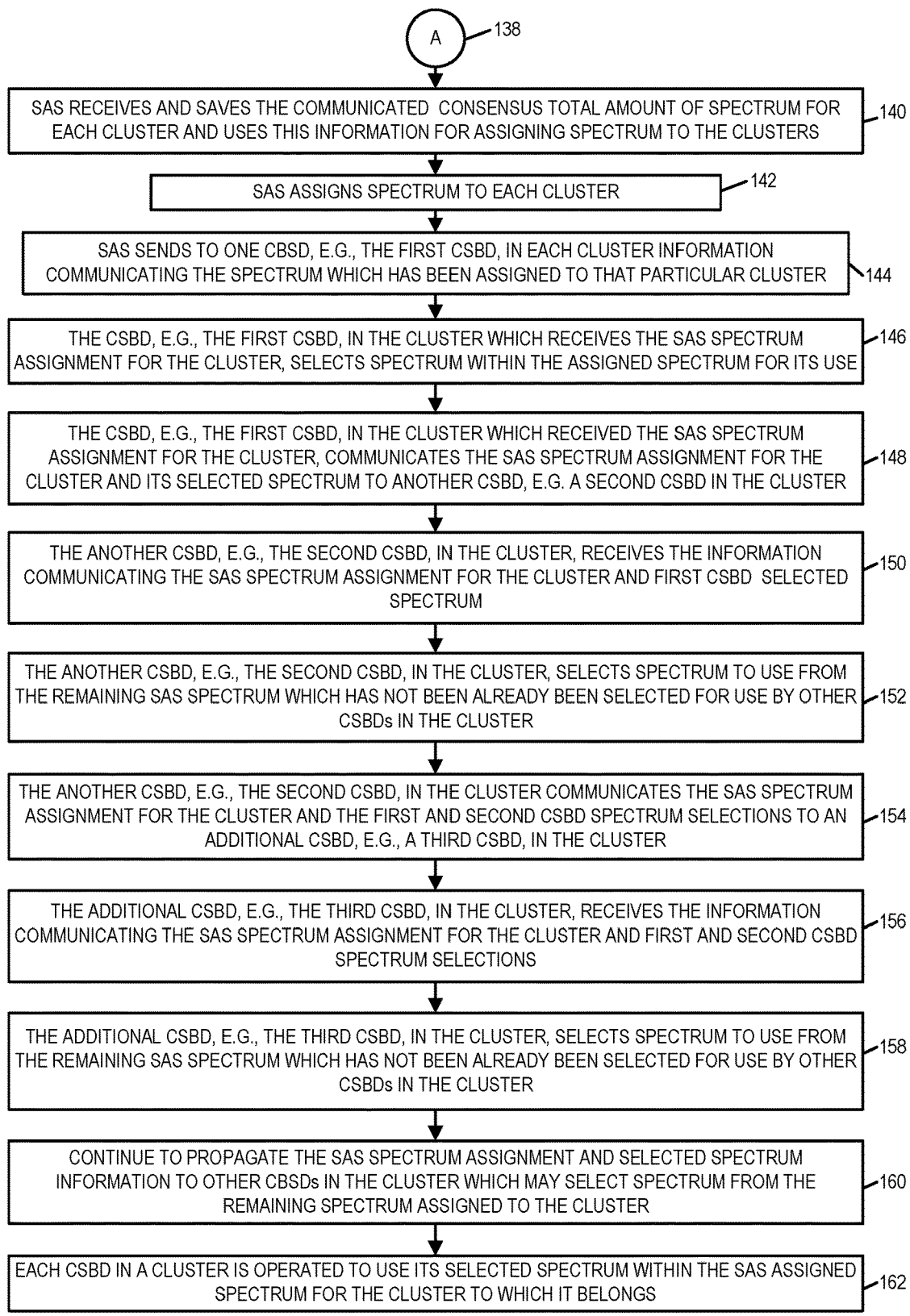
FIG. 1A is a first part of a flowchart of an exemplary method of operating a communications system, e.g., a communications system including a Spectrum Access System (SAS), e.g., a SAS node, a plurality of Citizens Broadband Radio Service (CBRS) Devices (CBSDs), and a plurality of user equipment (UE) devices.
FIG. 1B is a second part of a flowchart of an exemplary method of operating a communications system, e.g., a communications system including a Spectrum Access System (SAS) node, a plurality of Citizens Broadband Radio Service (CBRS) Devices (CBSDs), and a plurality of user equipment (UE) devices, in accordance with an exemplary embodiment.
FIG. 1 comprises the combination of FIG. 1A and FIG. 1B.
Figure 1A:
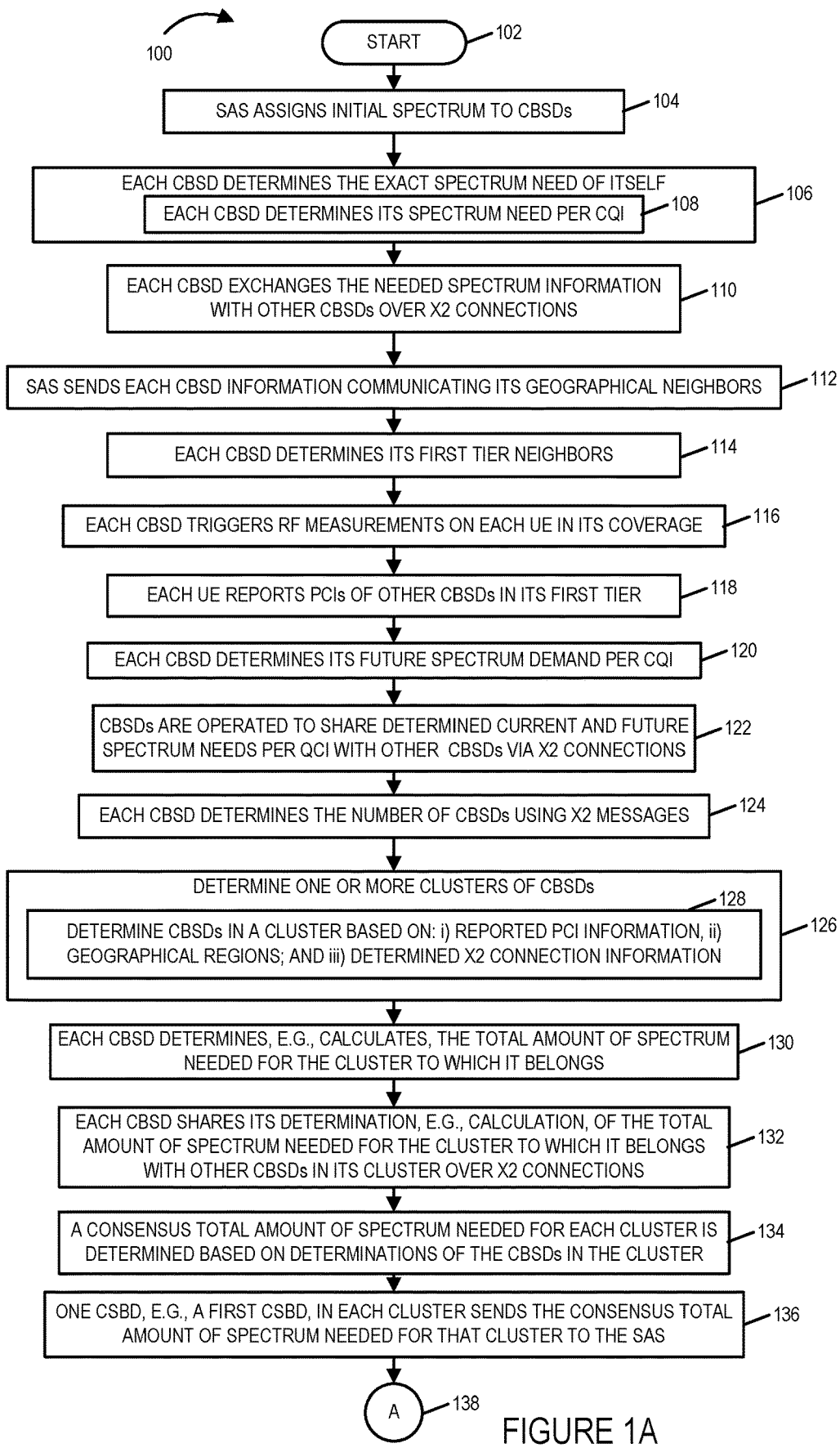

FIG. 1, comprising the combination of FIG. 1A and FIG. 1B, is a flowchart 100 of an exemplary method of operating a communications system, e.g., a communications system including a Spectrum Access System (SAS) node, a plurality of Citizens Broadband Radio Service (CBRS) Devices (CBSDs), and a plurality of user equipment (UE) devices, in accordance with an exemplary embodiment. Operation of the exemplary method starts in step 102 in which the communications system is powered on and initialized. Operation proceeds from step 102 to step 104.

In step 104 the SAS assigns initial spectrum to the CBSDs. Operation proceeds from step 104 to step 106. In step 106 each CBSD determines the each spectrum need for itself. Step 106 includes step 108, in which each CBSD determines its spectrum need per Channel Quality Indicator (CQI). Operation proceeds from step 104 to step 110.

In step 110 each CBSD exchanges the needed spectrum information with other CBSDs over X2 connections. Operation proceeds from step 110 to step 112.

In step 112 the SAS sends each CBSD information communicating its geographic neighbors, e.g., information communicating which other CBSDs are in its geographic vicinity. Operation proceeds from step 112 to step 114.

In step 114 each CBSD determines its first tier neighbors. Operation proceeds from step 114 to step 116. In step 116 each CBSD triggers RF measurements on each UE in its coverage. Operation proceeds from step 116 to step 118. In step 118, each UE reports Physical Cell Identifiers (PCIs) of other CBSDs in its first tier. Operation proceeds from step 118 to step 120.

In step 120 each CBSD determines its future spectrum demand per CQI. Operation proceeds from step 120 to step 122. In step 122, CBSDs are operated to shared determined current and future spectrum needs per QCI with other CBSDs via X2 connections. Operation proceeds from step 122 to step 124, in which each CBSD determines the number of CBSDs using X2 connections. Operation proceeds from step 124 to step 126.

In step 126 one or more clusters, e.g., groups, of CBSDs are determined. In some embodiments, a cluster is determined by: i) a CBSD or ii) by a group of CBSDs working in collaboration to reach a consensus as to the members to be included in the group, or iii) by the SAS. In some embodiments, an individual CBSD may only belong to one cluster of CBSDs at a particular time.

Step 126 includes step 128 in which the CBSDs in a cluster is determined based on: i) reported PCI information, ii) geographical regions, and/or iii) determined X2 connection information. Each CBSD is made aware of the cluster to which it belongs and the particular set of CBSDs in the cluster to which it belongs. In some embodiments, there is a maximum cluster size, and the addition of additional CBSDs in a particular local region may, and sometimes does, result in a reconfiguration of clusters in the system. Operation proceeds from step 126 to step 130.

In step 130 each CBSD determines, e.g., calculates the total amount of spectrum need for the cluster to which it belongs. Operation proceeds from step 130 to step 132 in which each CBSD shares its determination, e.g., calculation, of the total amount of spectrum needed for the cluster to which it belongs with the other CBSDs in its cluster over X2 connections. Operation proceeds from step 132 to step 134.

In step 134 a consensus total amount of spectrum needed for each cluster is determined based on the determinations of the CBSDs in the cluster. Operation proceeds from step 134 to step 136. In step 136 one CBSD, e.g. a first CBSD, in each cluster sends the consensus total amount of spectrum needed for that cluster to the SAS. In some embodiments, one CBSD in each cluster is selected and designated as the CBSD which is to communicate with the SAS, e.g., regarding sending cluster spectrum needs and receiving cluster spectrum assignments. In some embodiments, the selected CBSD, which is to interface with the SAS, regarding cluster spectrum needs and cluster spectrum assignments, is selected, e.g., by the CBSDs in the cluster, based on connection characteristics to the SAS, e.g., the CBSD with the shortest path and/or best quality connection to the SAS is selected. Operation proceeds from step 136, via connecting node A 138 to step 140.

In step 140 the SAS receives and saves the communicated consensus total amount of spectrum needed for each cluster and using this information for assigning spectrum to the clusters. Operation proceeds from step 140 to step 142. In step 142 the SAS assigns spectrum to each cluster. If there is enough spectrum available to satisfy each of the clusters requested needs, then the SAS may, and sometimes does assign each cluster its requested amount. However, if there is not enough spectrum available to satisfy all of the clusters requested needs, then the SAS may, and, sometimes, does assign, at least some of the clusters less spectrum than requested by the cluster. In some embodiment, where there is not enough spectrum available to satisfy all the clusters needs, each cluster is proportionally assigned a reduced amount of spectrum. In some other embodiment, clusters in the system are ranked so that some clusters are more likely to have there needs satisfied than other clusters, under conditions where total requested spectrum for the set of clusters exceeds the total spectrum which the SAS assigns. Operation proceeds from step 142 to step 144.

In step 144 the SAS sends to one CBSD, e.g., the first CBSD, in each cluster, information communicating the spectrum which has been assigned to that particular cluster. In some embodiments, the information communicating the spectrum which has been assigned to that particular cluster includes information communicating an amount(s) of spectrum and a range(s) of spectrum which has been assigned to the cluster. In some embodiments, the assignment of spectrum to the cluster is a single contiguous block of spectrum. In some embodiments, the assignment of spectrum to the cluster is one or more blocks of spectrum, where two assigned block of spectrum may be, and sometimes are, non-contiguous. Operation proceeds from step 144 to step 146.

In step 146, the CBSD, e.g., the first CBSD, in the cluster which receives the SAS spectrum assignment for the cluster, selects spectrum within the assigned spectrum for its use. Operation proceeds from step 146 to step 148.

In step 148, the CBSD, e.g., the first CBSD, in the cluster which received the SAS spectrum assignment for the cluster, communicates the SAS spectrum assignment for the cluster and its selected spectrum to another CSBD, e.g., a second CSBD, in the cluster. Operation proceeds from step 148 to step 150.

In step 150, the another CBSD, e.g., the second CBSD, in the cluster, receives the information communicating the SAS spectrum assignment for the cluster and the first CBSD selected spectrum. Operation proceeds from step 150 to step 152.

In step 152 the another CBSD, e.g., the second CBSD, selects spectrum to use from the remaining SAS assigned spectrum for the cluster which has not already been selected for use by other CBSBs in the cluster. Operation proceeds from step 152 to step 154.

In step 154, the another CBSD, e.g., the second CBSD, in the cluster communicates the SAS spectrum assignment for the cluster and the first and second CSBD spectrum selections to an additional CSBD, e.g., a third CSBD, in the cluster. Operation proceeds from step 154 to step 156.

In step 156 the additional CSBD, e.g., the third CSBD, in the cluster receives the information communicating the SAS spectrum for the cluster and the first and second CSBD spectrum. Operation proceeds from step 156 to step 158.

In step 158 the additional CSBD, e.g., the third CSBD, in the cluster selects spectrum to use from the remaining SAS assigned spectrum which has not already been selected for use by other CSBDs in the cluster. Operation proceeds from step 158 to step 160.

In step 160 the additional CSBD, e.g., the third CSBD, in the cluster continues to propagate the SAS spectrum assignment information and selected spectrum information to yet another CSBD in the cluster, which may select spectrum to use from the remaining spectrum assigned to the cluster. This process is repeated until each of the CSBDs in the cluster, which was part of the request for spectrum, has received spectrum. Operation proceeds from step 160 to step 162.

In step 162 each CBSD is operated to use its selected spectrum within the SAS assigned spectrum for the cluster to which it belongs.

Figure 2:
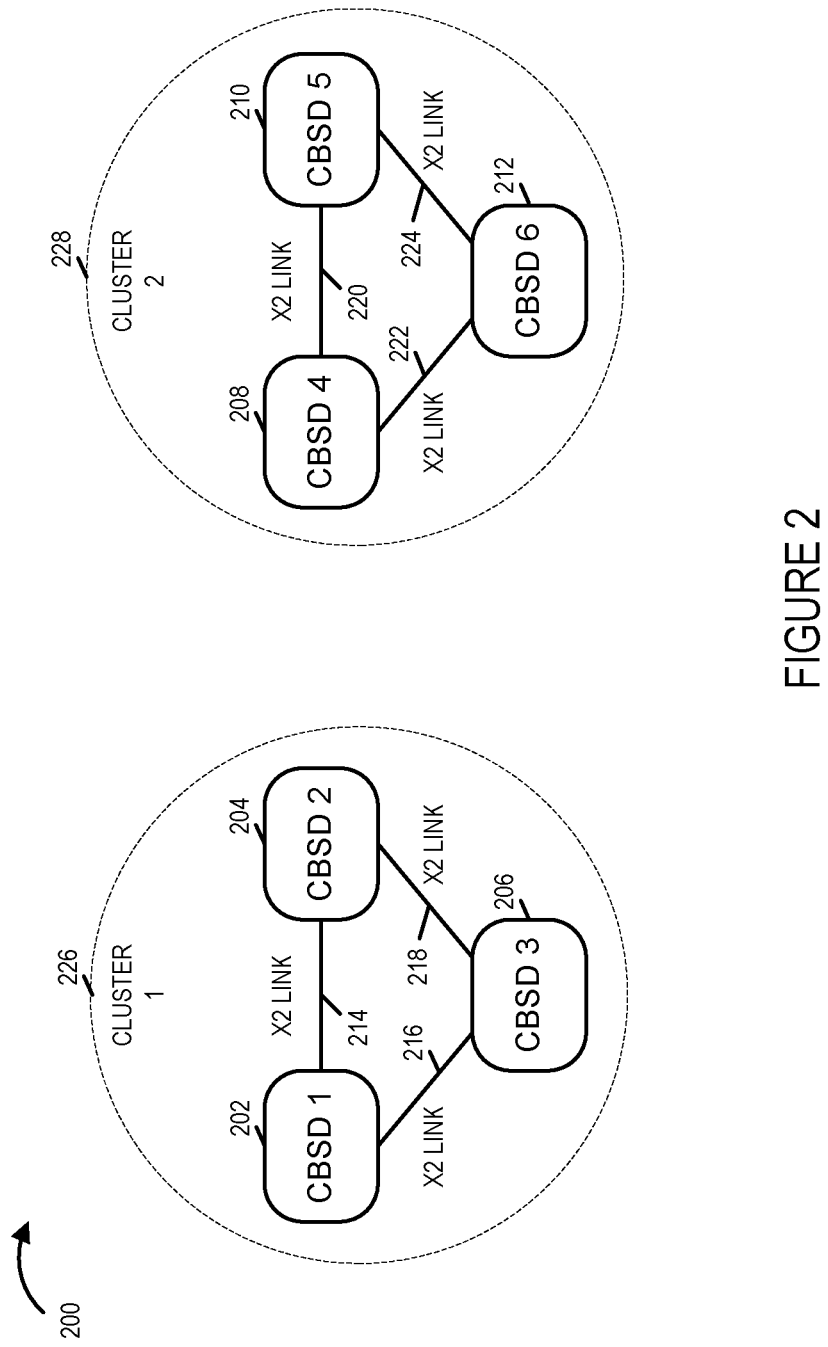
FIG. 2 is a drawing of two exemplary clusters of CBSDs which have been formed based on: i) reported PCI information, ii) geographic regions, and/or iii) determined X2 connection information.

FIG. 2 is a drawing 200 of a two exemplary clusters (cluster 1 226, cluster 2 228) which have been formed based on: i) reported PCI information, ii) geographic regions, and/or iii) determined X2 connection information. Exemplary cluster 1 226 includes CSBD 1 202, CSBD 2 204 and CSBD 3 206. There is an X2 link 214 between CSBD 1 202 and CSBD 2 204. There is an X2 link 216 between CSBD 1 202 and CSBD 3 206. There is an X2 link 218 between CSBD 2 204 and CSBD 3 206. Exemplary cluster 2 228 includes CSBD 4 208, CSBD 5 210 and CSBD 6 212. There is an X2 link 220 between CSBD 4 208 and CSBD 5 210. There is an X2 link 222 between CSBD 4 208 and CSBD 6 212. There is an X2 link 2224 between CSBD 5 210 and CSBD 6 212.

Figure 3:
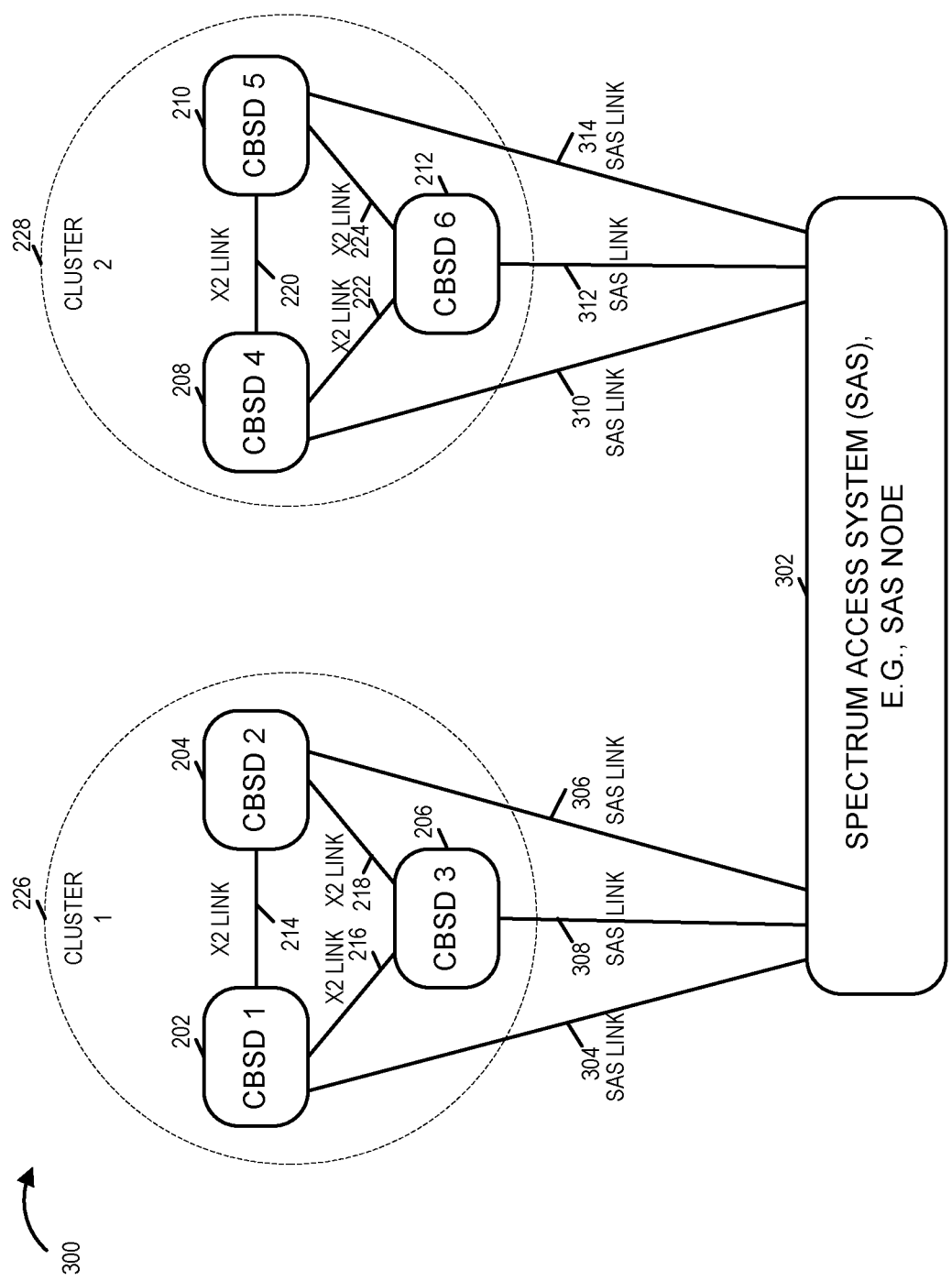
FIG. 3 is a drawing of an exemplary communications system including the CBSD clusters of FIG. 2 and further including a spectrum access system (SAS) node in accordance with an exemplary embodiment.

FIG. 3 is a drawing of an exemplary communications system 300 including the clusters (cluster 1 226 and cluster 2 228) of FIG. 2 and further including a spectrum access system (SAS) node 302 in accordance with an exemplary embodiment. Each of the CBSDs in cluster 1 226 (CBSD 1 202, CBSD 2 204, CBSD 3304) is coupled to the SAS 302 via a SAS link (SAS link 304, SAS link 306, SAS link 308), respectively. Each of the CBSDs in cluster 2 228 (CBSD 4 208, CBSD 5 210, CBSD 6 212) is coupled to the SAS 302 via a SAS link (SAS link 310, SAS link 312, SAS link 314), respectively.

In accordance with a feature of some embodiment, one of the CBSDs, in a cluster sends a request for a total amount of spectrum needed for the cluster to the SAS over its SAS link and, in response, receives a spectrum assignment for the cluster. For example, in one embodiment, CSBD 3 206 in cluster 1 226 and CSBD 6 212 in cluster 2 228 may serve as the interface nodes for communicating cluster total needed spectrum to SAS 302 and for receiving SAS assigned spectrum for the clusters (226, 228).

Thus the CBDSs in a cluster work together in collaboration, e.g., communicating over their X2 connection, to determine a total amount of spectrum needed for the cluster, and then one of the CBSDs in the cluster communicates the determined total amount of spectrum needed for the cluster to the SAS. The SAS receives spectrum requests from multiple clusters, and assigns spectrum to each cluster.

One CBSD in a cluster receives the spectrum assignment for the cluster from the SAS. Then the SAS spectrum assignment information is distributed within the cluster via X2 signaling between the CBSDs of the cluster, e.g., along with individual spectrum selection by the individual CBSDs of the cluster.

This approach reduces, e.g., minimizes, signaling between CSBDs and the SAS regarding determining spectrum needs and communicating assigned spectrum. This approach is especially advantageous where there are a very large number of CBSDs are in a cluster and/or where there are a very large number of CBDS in the communications system for which spectrum is being assigned by a SAS.

Figure 4:
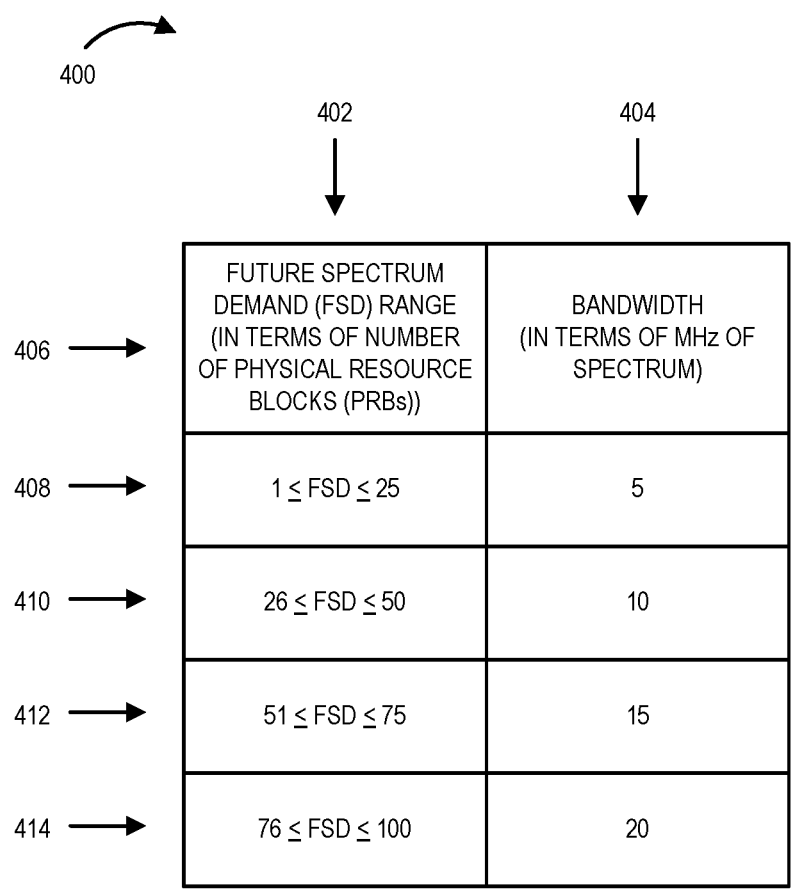
FIG. 4 is an exemplary table illustrating a relationship between physical resource blocks needed and bandwidth in accordance with an exemplary embodiment.

FIG. 4 is an exemplary table 400 illustrating a relationship between physical resource blocks needed and bandwidth in accordance with an exemplary embodiment. First column 402 represents future spectrum demand (FSD) range in terms of number of physical resource blocks (FSD). Second column 404 represented bandwidth in terms of MHz of spectrum. First row 406 includes the headers, which identify each column. Second row 408 indicates that a future spectrum demand in the range of 1 to 25 physical resource blocks is mapped to correspond to a 5 MHz bandwidth request. Third row 410 indicates that a future spectrum demand in the range of 26 to 50 physical resource blocks is mapped to correspond to a 10 MHz bandwidth request. Fourth row 412 indicates that a future spectrum demand in the range of 51 to 75 physical resource blocks is mapped to correspond to a 15 MHz bandwidth request. Fifth row 414 indicates that a future spectrum demand in the range of 76 to 100 physical resource blocks is mapped to correspond to a 20 MHz bandwidth request.

Figure 5C:
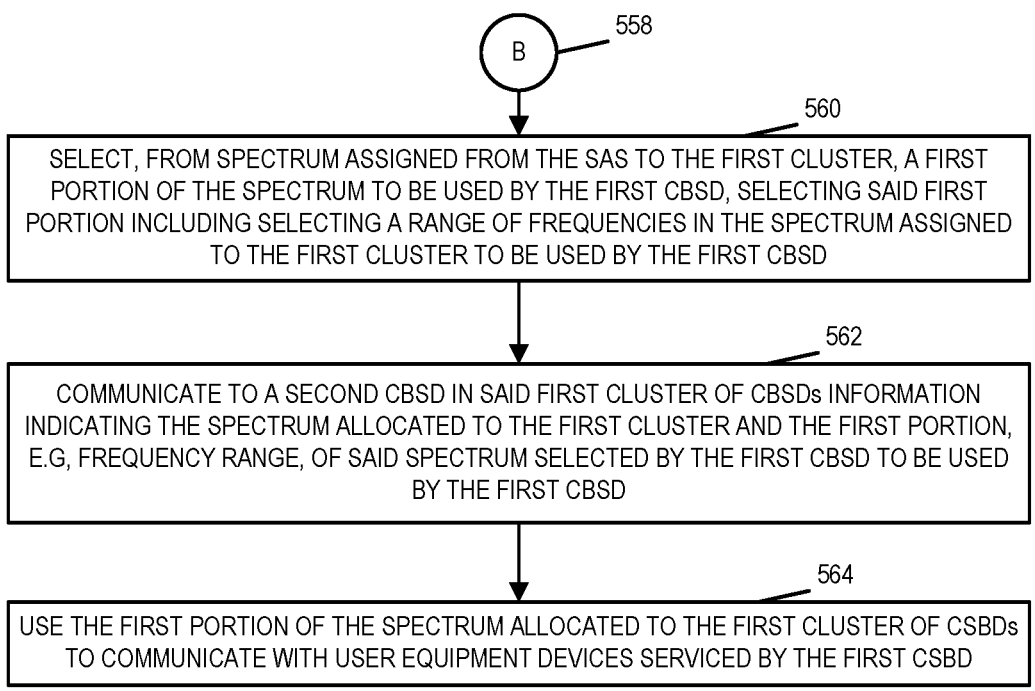
FIG. 5C is a third part of a flowchart of an exemplary method of operating a first Citizens Broadband Radio Service (CBRS) device (CBSD) in accordance with an exemplary embodiment.
Figure 5:
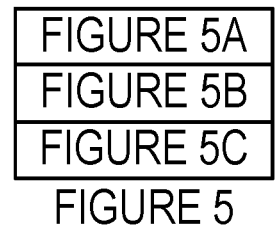
FIG. 5 comprises the combination of FIG. 5A, FIG. 5B and FIG. 5C.
Figure 5A:
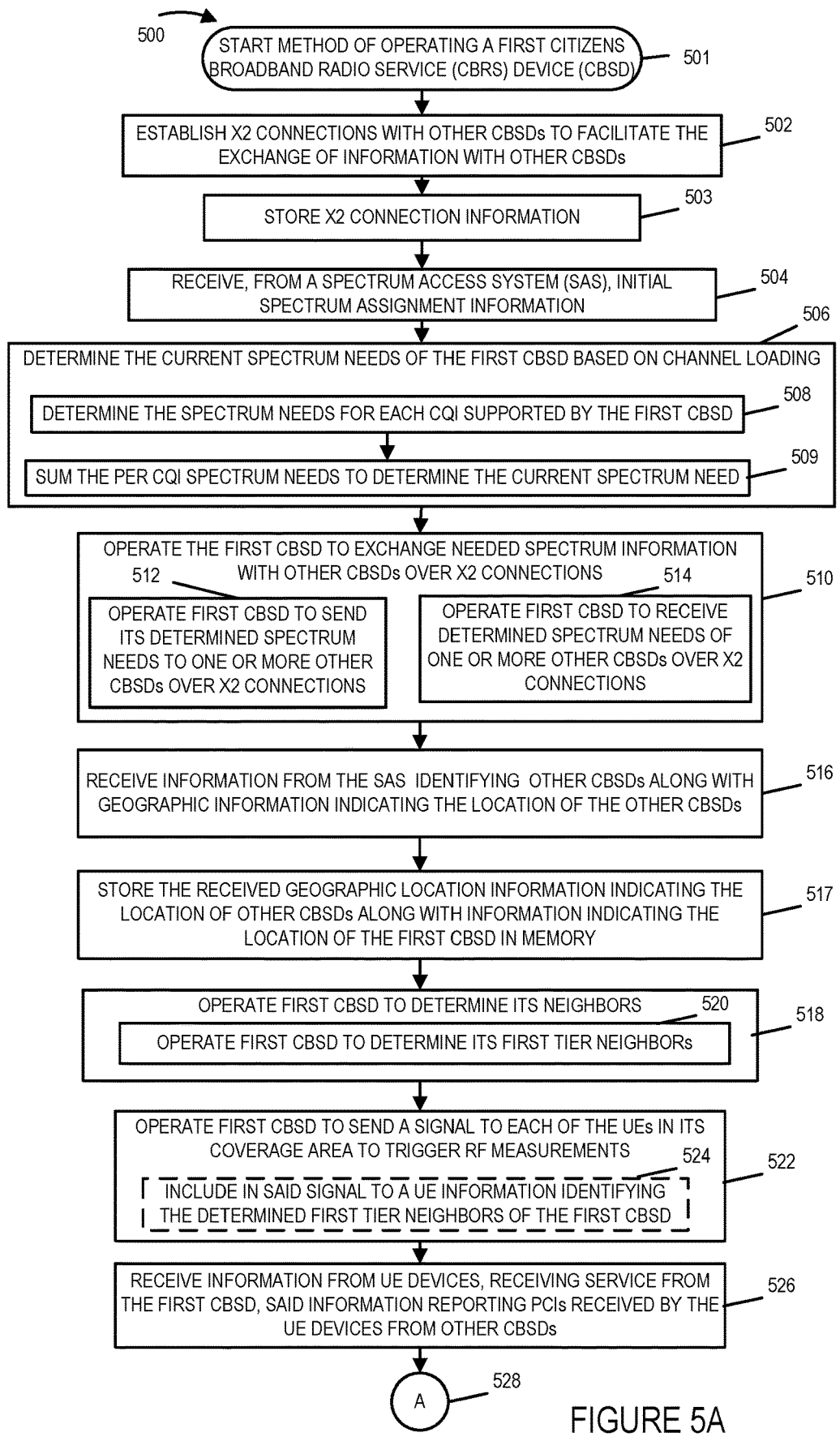
FIG. 5A is a first part of a flowchart of an exemplary method of operating a first Citizens Broadband Radio Service (CBRS) device (CBSD) in accordance with an exemplary embodiment.
Figure 5B:
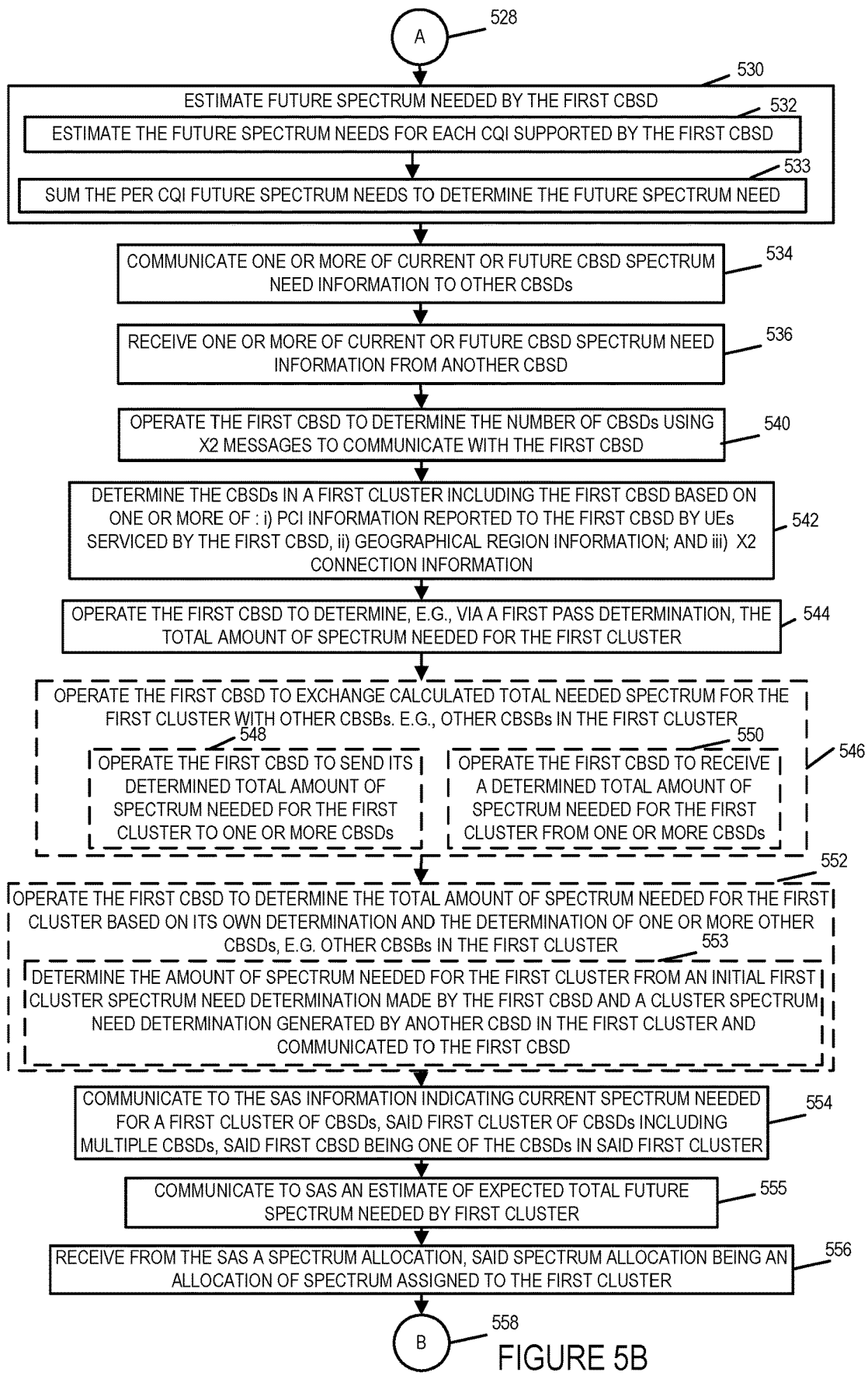
FIG. 5B is a second part of a flowchart of an exemplary method of operating a first Citizens Broadband Radio Service (CBRS) device (CBSD) in accordance with an exemplary embodiment.

FIG. 5, comprising the combination of FIG. 5A, FIG. 5B and FIG. 5C, is a flowchart 500 of an exemplary method of operating a first Citizens Broadband Radio Service (CBRS) device (CBSD) in accordance with an exemplary embodiment. Operation starts in step 501 in which the first CBSD is powered on and initialized. Operation proceeds from start step 501 to step 502.

In step 502 the first CBSD establishes X2 connection with other CBSDs to facilitate exchange of information with other CBSDs. Operation proceeds from step 502 to step 503. In step 503 the first CBSD stores X2 connection information in memory, e.g., for use in making cluster membership determination as well as to facilitate communications with other CBSDs. Operation proceeds from step 503 to step 504. In step 504 the first CBSD receives, from a Spectrum Access System (SAS), initial spectrum assignment information. Operation proceeds from step 504 to step 506.

In step 506 the first CBSD determines the current spectrum needs of the first CBSD based on channel loading. Step 506 includes steps 508 and 509. In step 508 the first CBSD determines the spectrum needs for each channel quality indicator (CQI) supported by the first CBSD. Operation proceeds from step 508 to step 509, in which the first CBSD sums the per CQI spectrum needs to determine the current spectrum need of the first CBSD. Operation proceeds from step 506 to step 510.

In step 510 the first CBSD is operated to exchange needed spectrum information with other CBSDs over X2 connections. Step 510 includes step 512 and 514. In step 512 the first CBSD is operated to send its determined spectrum needs to one or more other CBSDs over X2 connections. In step 514 the first CBSD is operated to receive determined spectrum needs of one or more CBSDs over X2 connections. Operation proceeds from step 510 to step 516.

In step 516, the first CBSD receives information from the SAS identifying other CBSDs along with geographic information indicating the location of the other CBSDs. Operation proceeds from step 516 to step 517. In step 517 the first CBSD stores the received geographic location information indicating the location of other CBSDs along with information indicating the location of the first CBSD in memory. Operation proceeds from step 517 to step 518. In step 518 the first CBSD determines its neighbors. Step 518 includes step 520 in which the first CBSD determines its first tier neighbors. Operation proceeds from step 518 to step 522.

In step 522 the first CBSD sends a signal to each of the UEs in its coverage area, e.g., a first CBRS cell corresponding to the first CBSD, to trigger RF measurements. In some embodiments step 522 includes step 524 in which the first CBSD includes in said signal to a UE information identifying the first tier neighbors of the first CBSD. Operation proceeds from step 522 to step 526. In step 526 the first CBSD receives information from UE devices, receiving service from the first CBSD, said information reporting Physical Cell Identifiers (PCIs) received by the UE devices from other CBSDs. This allows the first CBSD to become aware if other CBSDs which are in communication range of UEs being serviced by the first CBSD and thus which are near the first CBSD at least in terms of radio coverage area. Operation proceeds from step 526, via connecting node A 528, to step 530.

In step 530 the first CBSD estimates future spectrum needed by the first CBSD. Step 530 includes step 532 and step 533. In step 532 the first CBSD estimates the future spectrum needs for each CQI supported by the first CBSD. Operation proceeds from step 532 to step 533, in which the first CBSD sums the per CQI future spectrum needs to determine the future spectrum need for the first CBSD. Operation proceeds from step 530 to step 534.

In step 534 the first CBSD communicates one or more of current or future spectrum need information to other CBSDs. Operation proceeds from step 534 to step 536. In step 536 the first CBSD receives one ore more of current or future CBSD spectrum need information from another CBSD. Operation proceeds from step 536 to step 540. In step 540 the first CBSD determines the number of CBSDs using X2 connections to communicate with the first CBSD. Operation proceeds from step 540 to step 542.

In step 542, the first CBSD determines the CBSDs in a first cluster including the first CBSD based on one or more, e.g., one, multiple or all, of:) PCI information reported to the first CBSD by UEs serviced by the first CBSD, ii) geographical region information, e.g., which CBSDs are in the same geographical region as the first CBSD, known to the first CBSD or communicated to the first CBSD by the SAS, and iii) X2 connection information, e.g., which CBSDs have X2 connections with the first CBSD. Operation proceeds from step 542 to step 544.

In step 544 the first CBSD determines, e.g., via a first pass determination, the total amount of spectrum needed for the first cluster.

Steps 546, including steps 548 and 550, and step 552 including step 553, are optional steps, which are performed in some embodiments, and which are bypassed in other embodiments. In some embodiments, operation proceeds from step 544 to step 546. In other embodiments, operation proceeds from step 544 to step 554.

In step 546 the first CBSD exchanges calculated total needed spectrum for the first cluster with other CBSDs, e.g., other CBSDs in the first cluster. Step 546 includes step 548 and 550. In step 548 the first CBSD sends its determined total amount of spectrum needed for the first cluster to one of more CBSDs, e.g., one or more CBSDs in the first cluster. In step 550 the first CBSD receives a determined total amount of spectrum needed for the first cluster from one of more CBSDs, e.g., one or more CBSDs in the first cluster. Operation proceeds from step 546 to step 552.

In step 552 the first CBSD determines the total amount of spectrum needed for the first cluster based on its own determination and the determination of one or more other CBSDs, e.g., one or more CBSDs in the first cluster. Step 552 includes step 553 in which the first CBSD determines the amount of spectrum needed for the first cluster from an initial first cluster spectrum determination made by the first CBSB and a cluster spectrum need determination generated by another CSBD in the first cluster and communicated to the first CBSD. In some embodiments, the first CBSD picks the largest first cluster spectrum need determination that is made by any of the CBSDs in the first cluster to report to the SAS to be on the safe side in ensuring that the spectrum needs of the first cluster will be satisfied if the SAS grants the full request. In some such embodiments, this largest first cluster need determination is the amount that is reported in step 554 when step 552 including step 553 are implemented. Operation proceeds from step 552 to step 554.

In step 554 the first CBSD communicates to the SAS information indicating current spectrum needed for the first cluster of CBSDs, said first cluster of CBSDs including multiple CBSDs, said first CBSD being one of the CBSDs in said first cluster. The current spectrum needed for the first cluster of CBSDs, which is communicated to the SAS in step 554 is the value determined in step 544 or the value determined in step 552, depending upon the particular embodiment. The Operation proceeds from step 554 to step 555.

In step 555, the first CBSD communicates to the SAS an estimate of expected total future spectrum needed by the first cluster. For example, an estimate of the spectrum needs which are likely to be required for the period of time prior to the next allocation period is communicated in step 555. This estimate of the expected total future spectrum needed by the first cluster may be, and sometimes is, based on the rate at which UEs are making/terminating wireless connections with the CBSDs in the first cluster and/or other loading information that can be used to predicat future spectrum needs. Operation proceeds from step 555 to step 556.

In step 556 the first CBSD receives from the SAS a spectrum allocation, said spectrum allocation being an allocation of spectrum assigned to the first cluster. In some embodiments, the spectrum allocated to the first cluster is an amount of spectrum based on the current and future spectrum needs of the first cluster reported to the SAS. In at least some cases, the future spectrum need is indicated to be larger than the current spectrum need to allow for a predicated future increase in spectrum. Operation proceeds from step 556, via connecting node B 558, to step 560.

In step 560 the first CBSD selects from spectrum assigned from the SAS to the first cluster, a first portion of the spectrum to be used by the first CBSD, selecting said first portion including selecting a range of frequencies in the spectrum assigned to the first cluster to be used by the first CBSD. Operation proceeds from step 560 to step 562.

In step 562 the first CBSD communicates to a second CSBD in the first cluster of CBSDs information indicating the spectrum allocated to the first cluster and the first portion, e.g., frequency range, of said spectrum selected by the first CBSD to be used by the first CBSD. Operation proceeds from step 562 to step 564.

In step 564 the first CBSD uses the first portion of the spectrum allocated to the first cluster of CSBDs to communicate with user equipment (UE) devices serviced by the first CBSD. In some embodiments, the use of the first portion of the spectrum allocated to the first cluster is performed without using one or more additional portions allocated to the first cluster which are left to be available for use by other CBSDs in the first cluster.

Figure 6C:
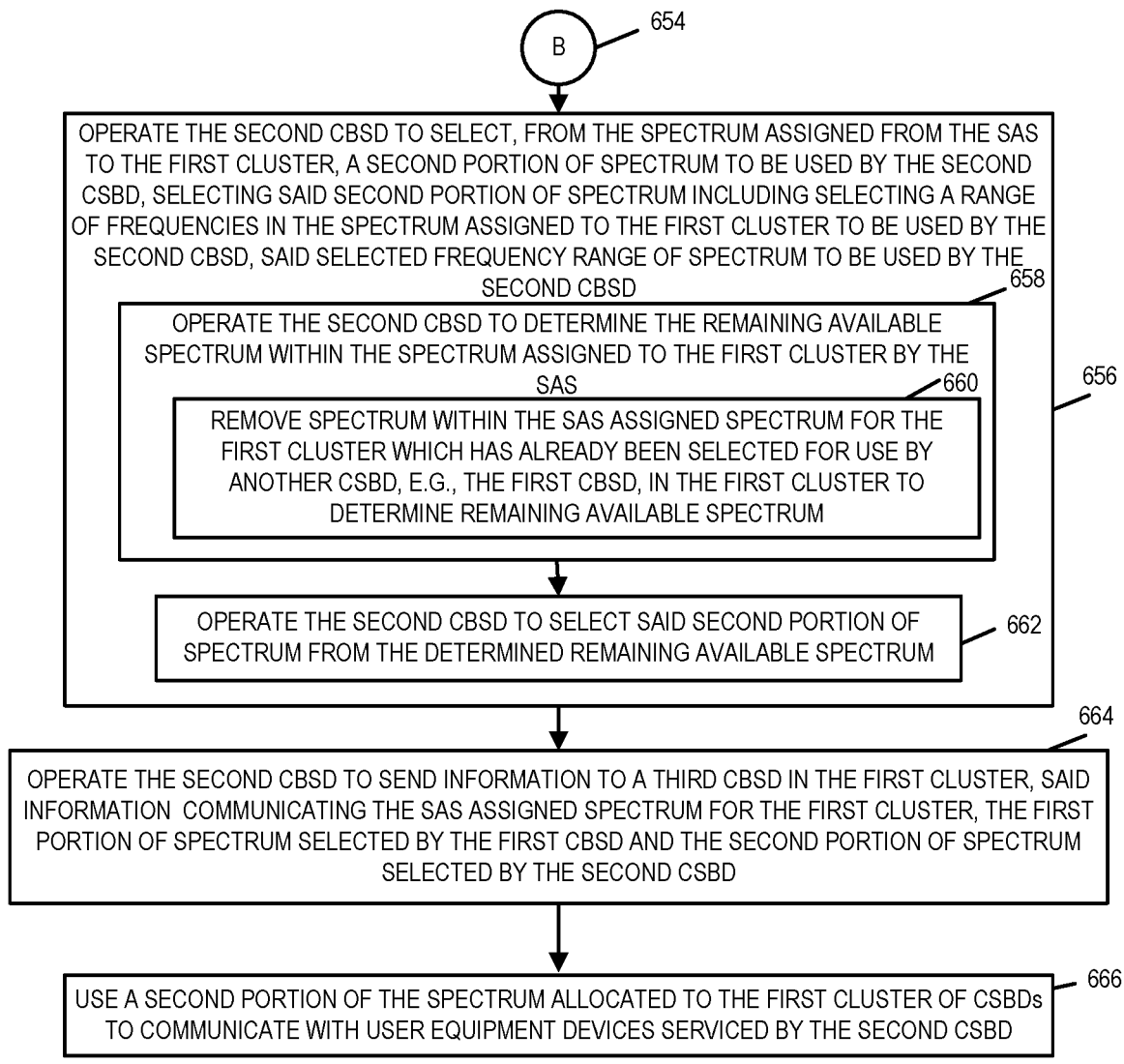
FIG. 6C is a third part of a flowchart of an exemplary method of operating a second Citizens Broadband Radio Service (CBRS) device (CBSD) in accordance with an exemplary embodiment.
Figure 6A:
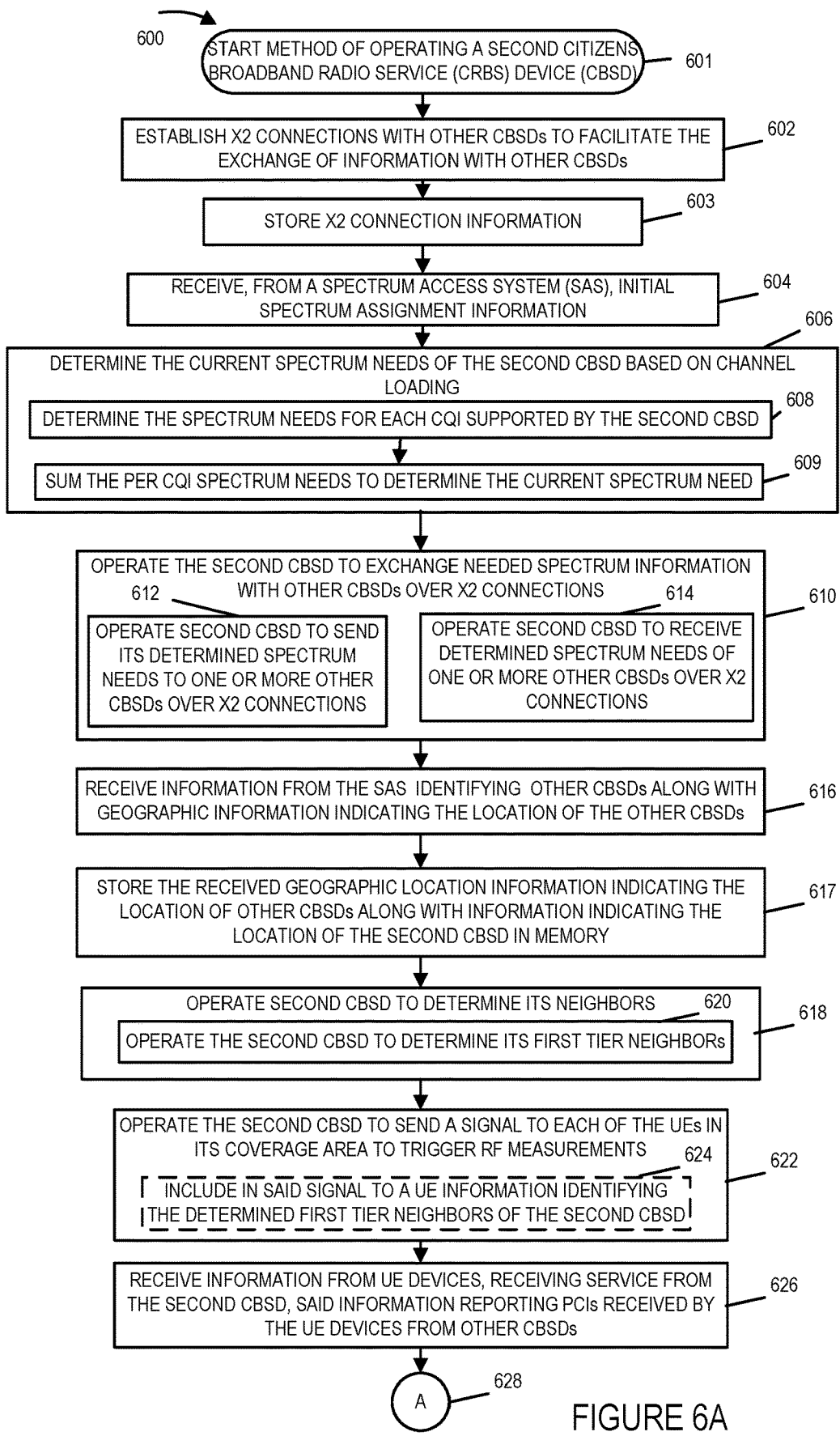
FIG. 6A is a first part of a flowchart of an exemplary method of operating a second Citizens Broadband Radio Service (CBRS) device (CBSD) in accordance with an exemplary embodiment.
Figure 6B:
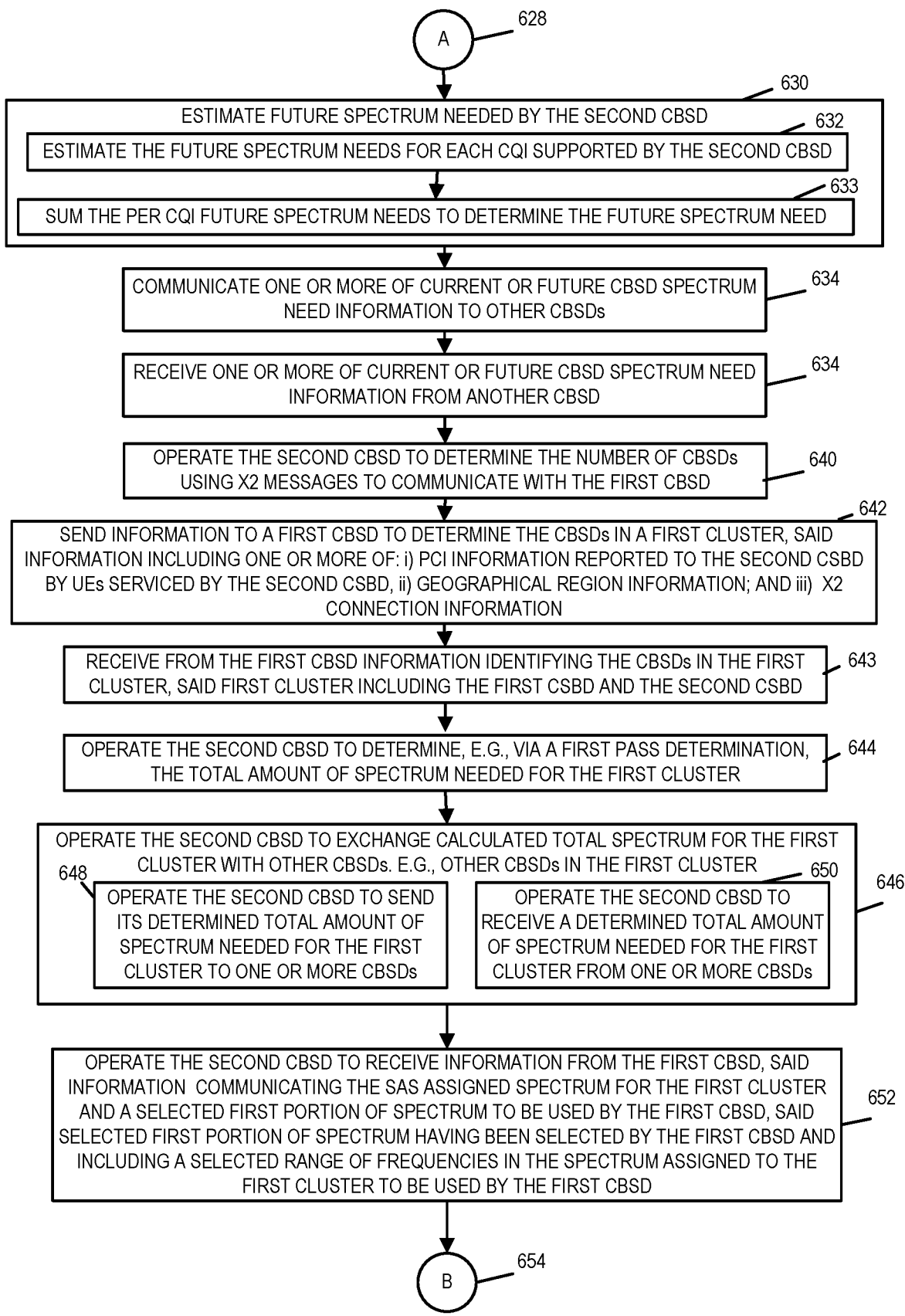
FIG. 6B is a second part of a flowchart of an exemplary method of operating a second Citizens Broadband Radio Service (CBRS) device (CBSD) in accordance with an exemplary embodiment.

FIG. 6, comprising the combination of FIG. 6A, FIG. 6B and FIG. 6C, is a flowchart 600 of an exemplary method of operating a second Citizens Broadband Radio Service (CBRS) device (CBSD) in accordance with an exemplary embodiment. Operation starts in step 601 in which the second CBSD is powered on and initialized. Operation proceeds from start step 601 to step 602.

In step 602 the second CBSD establishes X2 connection with other CBSDs to facilitate exchange of information with other CBSDs. Operation proceeds from step 602 to step 603. In step 603 the second CBSD stores X2 connection information in memory. Operation proceeds from step 603 to step 604. In step 604 the second CBSD receives, from a Spectrum Access System (SAS), initial spectrum assignment information. Operation proceeds from step 604 to step 606.

In step 606 the second CBSD determines the current spectrum needs of the second CBSD based on channel loading. Step 606 includes steps 608 and 609. In step 608 the second CBSD determines the spectrum needs for each channel quality indicator (CQI) supported by the second CBSD. Operation proceeds from step 608 to step 609, in which the second CBSD sums the per CQI spectrum needs to determine the current spectrum need of the second CBSD. Operation proceeds from step 606 to step 610.

In step 610 the second CBSD is operated to exchange needed spectrum information with other CBSDs over X2 connections. Step 610 includes step 612 and 614. In step 612 the second CBSD is operated to send its determined spectrum needs to one or more other CBSDs over X2 connections. In step 614 the second CBSD is operated to receive determined spectrum needs of one or more CBSDs over X2 connections. Operation proceeds from step 610 to step 616.

In step 616, the second CBSD receives information from the SAS identifying other CBSDs along with geographic information indicating the location of the other CBSDs. Operation proceeds from step 616 to step 617. In step 617 the second CBSD stores the received geographic location information indicating the location of other CBSDs along with information indicating the location of the second CBSD in memory. Operation proceeds from step 617 to step 618. In step 618 the second CBSD determines its neighbors. Step 618 includes step 620 in which the second CBSD determines its first tier neighbors. Operation proceeds from step 618 to step 622.

In step 622 the second CBSD sends a signal to each of the UEs in its coverage area, e.g., a second CBRS cell corresponding to the second CBSD, to trigger RF measurements. In some embodiments step 622 includes step 624 in which the second CBSD includes in said signal to a UE information identifying the first tier neighbors of the second CBSD. Operation proceeds from step 622 to step 626. In step 626 the second CBSD receives information from UE devices, receiving service from the second CBSD, said information reporting Physical Cell Identifiers (PCIs) received by the UE devices from other CBSDs. Operation proceeds from step 626, via connecting node A 628, to step 630.

In step 630 the second CBSD estimates future spectrum needed by the second CBSD. Step 530 includes step 632 and step 633. In step 632 the second CBSD estimates the future spectrum needs for each CQI supported by the second CBSD. Operation proceeds from step 632 to step 633, in which the second CBSD sums the per CQI future spectrum needs to determine the future spectrum need for the second CBSD. Operation proceeds from step 630 to step 634.

In step 634 the second CBSD communicates one or more of current or future spectrum need information to other CBSDs. Operation proceeds from step 634 to step 636. In step 636 the second SBSD receives one or more of current or future CBSD spectrum need information from another CBSD. Operation proceeds from step 636 to step 640. In step 640 the second CBSD determines the number of CBSDs using X2 connections to communicate with the first CBSD. Operation proceeds from step 640 to step 642.

In step 642, the second CBSD sends information to a first CBSD, said information to be used to determine CSBDs in a first cluster, said information including one or more of: i) PCI information reported to the second CBSD by UEs serviced by the second CBSD, ii) geographical region information, and iii) X2 connection information. Operation proceeds from step 642 to step 643.

In step 643, the second CBSD receives from the first CBSD information identifying CBSDs, in the first cluster, said first cluster including the first CBSD and said second CBSD. Operation proceeds from step 643 to step 644.

In step 644 the second CBSD determines, e.g., via a first pass determination, the total amount of spectrum needed for the first cluster. Operation proceeds from step 644 to step 646.

In step 546 the second CBSD exchanges calculated total needed spectrum for the first cluster with other CBSDs, e.g., other CBSDs in the first cluster. Step 646 includes step 648 and 650. In step 648 the second CBSD sends its determined total amount of spectrum needed for the first cluster to one of more CBSDs, e.g., one or more CBSDs in the first cluster. In step 650 the second CBSD receives a determined total amount of spectrum needed for the first cluster from one of more CBSDs, e.g., one or more CBSDs in the first cluster. Operation proceeds from step 646 to step 652.

In step 652 the second CBSD receives information for the first CBSD, said information communicating the SAS assigned spectrum for the first cluster and a selected first portion of spectrum to be used by the first CBSD, said selected first portion of spectrum having been selected by the first CBSD and including a selected range of frequencies in the spectrum assigned to the first cluster to be used by the first CBSD. Operation proceeds from step 652, via connecting node B 654 to step 656.

In step 656 the second CBSD selects, from the spectrum assigned from the SAS to the first cluster, a second portion of spectrum to be used by the second CSBD, selecting said second portion of spectrum to be used by the second CSBD including selecting a range of frequencies in the spectrum assigned to the first cluster to be used by the second CBSD. Step 656 includes step 658 and step 652. In step 658 the second CSBD determines the remaining available spectrum within the spectrum assigned to the first cluster by the SAS. Step 658 includes step 660 in which the second CSBD removes spectrum within the DAS assigned spectrum for the first cluster which has already been selected for use by another CSBD, e.g., the first CSBD, in the first cluster, to determine the remaining available spectrum. Operation proceeds from step 658 to step 662. In step 662 the second CBSD selected said second portion of the spectrum from the determined remaining available spectrum. Operation proceeds from step 656 to step 664.

In step 664 the send CBSD sends information to a third CSBD in the first cluster of CBSDs, said information communicating the SAS assigned spectrum for the first cluster, the first portion of spectrum selected by the first CSBD and the second portion of spectrum selected by the second CBSD. Operation proceeds from step 664 to step 666.

In step 666 the second CBSD uses the second portion of the spectrum allocated to the first cluster of CSBDs to communicate with user equipment (UE) devices serviced by the second CBSD.

Figure 7:
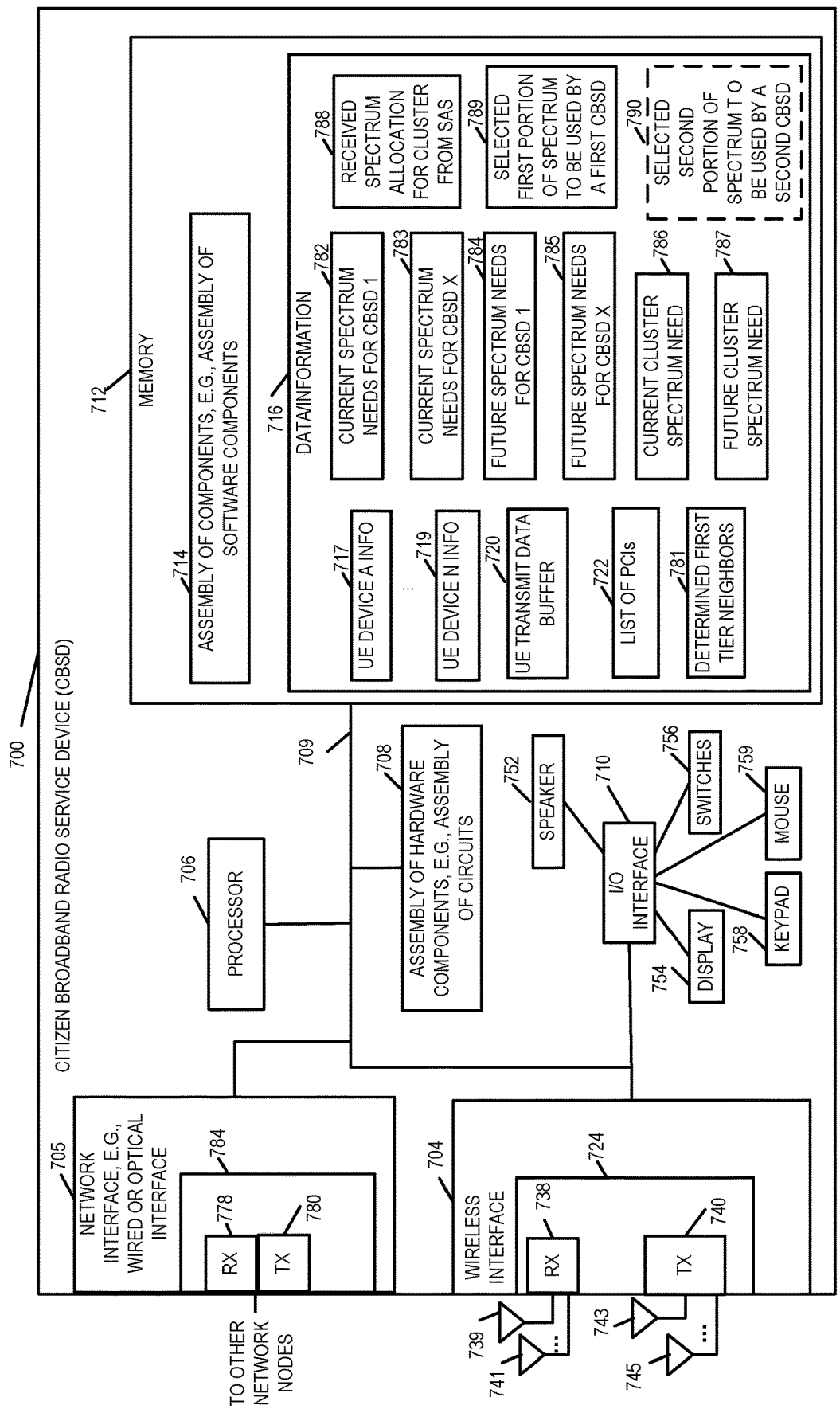
FIG. 7 is a drawing of an exemplary citizens broadband radio service (CBRS) device (CBSD), implemented in accordance with an exemplary embodiment.
Figure 12:
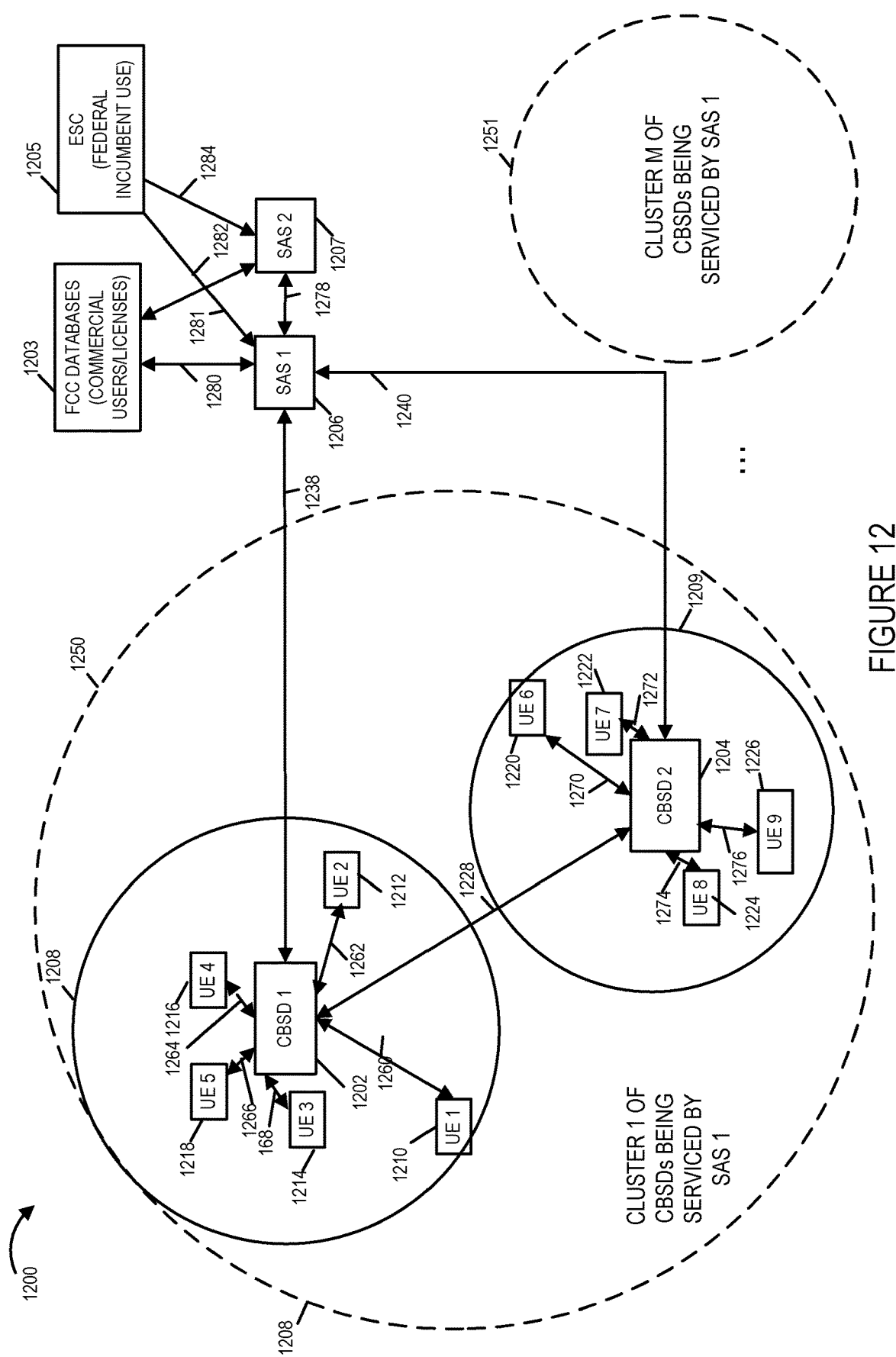
FIG. 12 illustrates an exemplary Citizens Broadband Radio Service network system that provides wireless communications services in accordance one embodiment of the present invention.

FIG. 7 is a drawing of an exemplary Citizens Broadband Radio Service Device (CBSD) 700 in accordance with an exemplary embodiment. The CBSD 700 implements the methods of flowchart 500 of FIG. 5 and/or flowchart 600 of FIG. 6. The CBSD 700 is, e.g. one of the CBSDs (202, 204, 206, 208, 210, 212) of FIG. 2 or FIG. 3 and/or one of the CBSDs (1202, 1204) of FIG. 12. The CBSD 700 is, e.g., part of cluster of multiple CBSD. CBSD 700 determines its own spectrum needs and the spectrum needs of the cluster to which it belongs. The CBSD exchanges information with other CBSD in the cluster to which it belongs, e.g. via X2. In some embodiments, the CBSD 700 sends a determined cluster spectrum need to a SAS and receives a cluster spectrum allocation from the SAS. The CBSD device 700, in some embodiments, incorporates Long Term Evolution (LTE), e.g., 4G LTE, eNodeB base station/access point capabilities such as determination of a user equipment device's timing advance and/or commands to request user equipment devices to report power headroom values. The CBSD device 700 also includes the capabilities of a CBSD as defined by the Federal Communications Commission's Rules with Regard to Commercial Operations in the 3550-3650 MHz Band. Exemplary CBSD device 700 includes a wireless interface 704, a network interface 705, e.g., a wired or optical interface, a processor 706, e.g., a CPU, an assembly of hardware components 708, e.g., an assembly of circuits, and I/O interface 710 and memory 712 coupled together via a bus 709 over which the various elements may interchange data and information. CBSD device 700 further includes a speaker 752, a display 754, switches 756, keypad 758 and mouse 759 coupled to I/O interface 710, via which the various I/O devices (752, 754, 756, 758, 759) may communicate with other elements (704, 706, 708, 712) of the CBSD device 700. Network interface 705 includes a receiver 778 and a transmitter 780. In some embodiments, receiver 778 and transmitter 780 are part of a transceiver 784. Wireless interface 704 includes a wireless receiver 738 and a wireless transmitter 740. In some embodiments, receiver 738 and transmitter 740 are part of a transceiver 742. In various embodiments, wireless interface 704 includes a plurality of wireless receivers and a plurality of wireless transmitters. Wireless receiver 738 is coupled to a plurality of receive antennas (receive antenna 1 739, . . . , receive antenna M 741), via which CBSD device 700 can receive wireless signal from other wireless communications devices including a second wireless communications device, e.g., a UE device. Wireless transmitter 740 is coupled to a plurality of wireless transmit antennas (transmit antenna 1 743, . . . , transmit antenna N 745) via which the CBSD 700 can transmit signals to other wireless communications devices including a second wireless communications device, e.g., a UE device. Memory 712 includes an assembly of component 714, e.g., an assembly of software components, and data/information 716. Data/information 716 includes UE device information corresponding to a plurality of user equipment devices (UE device A information 717, . . . , UE device N information 719 where A to N are the UE devices being serviced by the CBSD for example CBSD 1 1202 UE 1 . . . UE 5 as shown in FIG. 12, UE transmit data buffer 720, and List of PCIs (Physical Cell Identifier List) 722. Data/ information 716 further includes determined first tier neighbors 781, current spectrum needs for CBSD 1, . . . current spectrum needs for CBSD X 783, future spectrum needs for CBSD 1 784, . . . , future spectrum needs for CBSD X 785, e.g., where the cluster to which CBSD belongs includes X CBSDs, current cluster spectrum needs 786, future cluster spectrum needs 787, received spectrum allocation for the cluster 788, selected first portion of spectrum 789 from the SAS allocated spectrum for the cluster, said first portion to be used by a first CBSD, and a selected second portion of spectrum 789 from the SAS allocated spectrum for the cluster, said second portion to be used by a second CBSD. In some embodiments, CBSDs 202, 204, 206, 208, 210, 212 of FIG. 2 and FIG. 3, CBSD 1 1202 and/or CBSD 2 1204, are implemented in accordance with CBSD 700.

Figures 8, 8C:
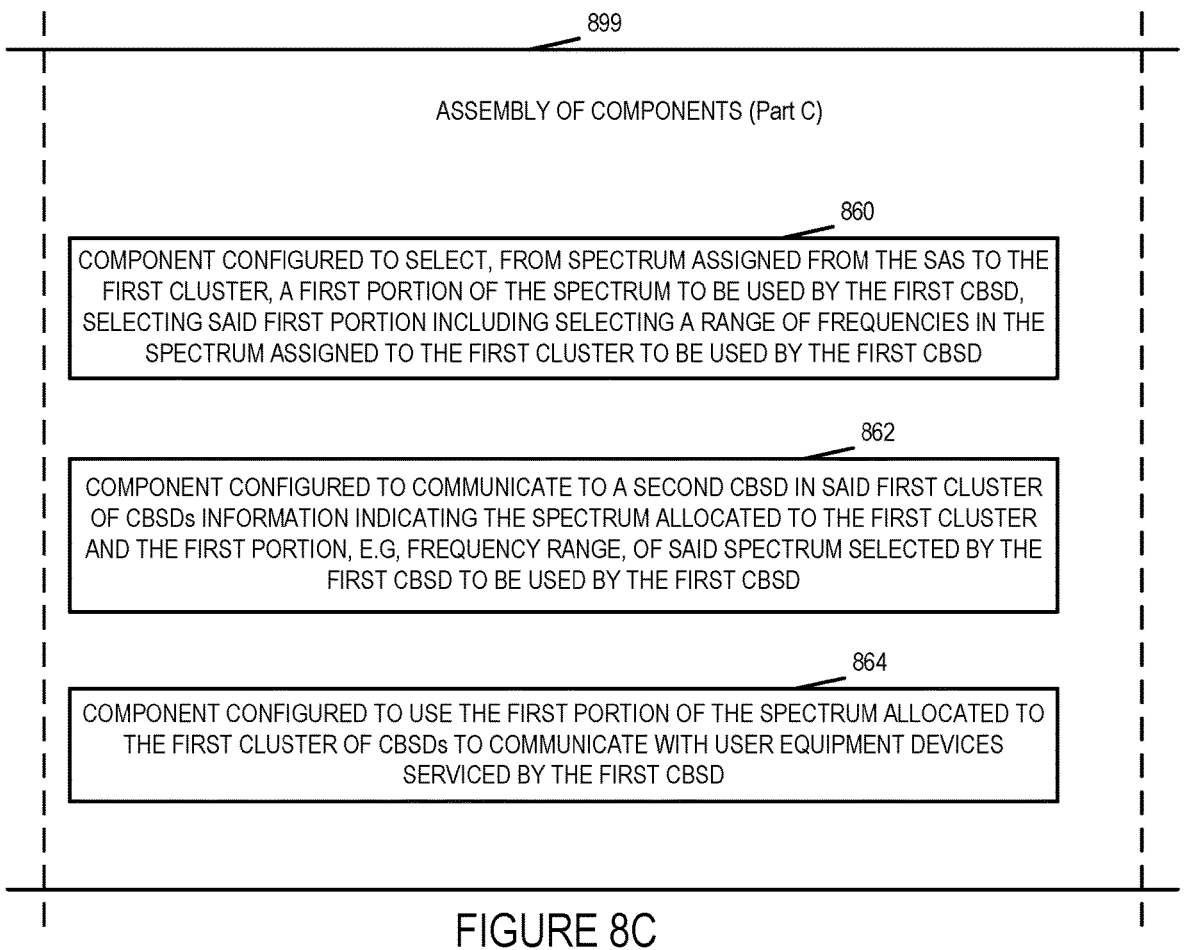
FIG. 8C is a drawing of a third part of an assembly of components, which may be included in and an exemplary first CBSD, in accordance with an exemplary embodiment.
FIG. 8 comprises the combination of FIG. 8A, FIG. 8B and FIG. 8C.
Figure 8A:
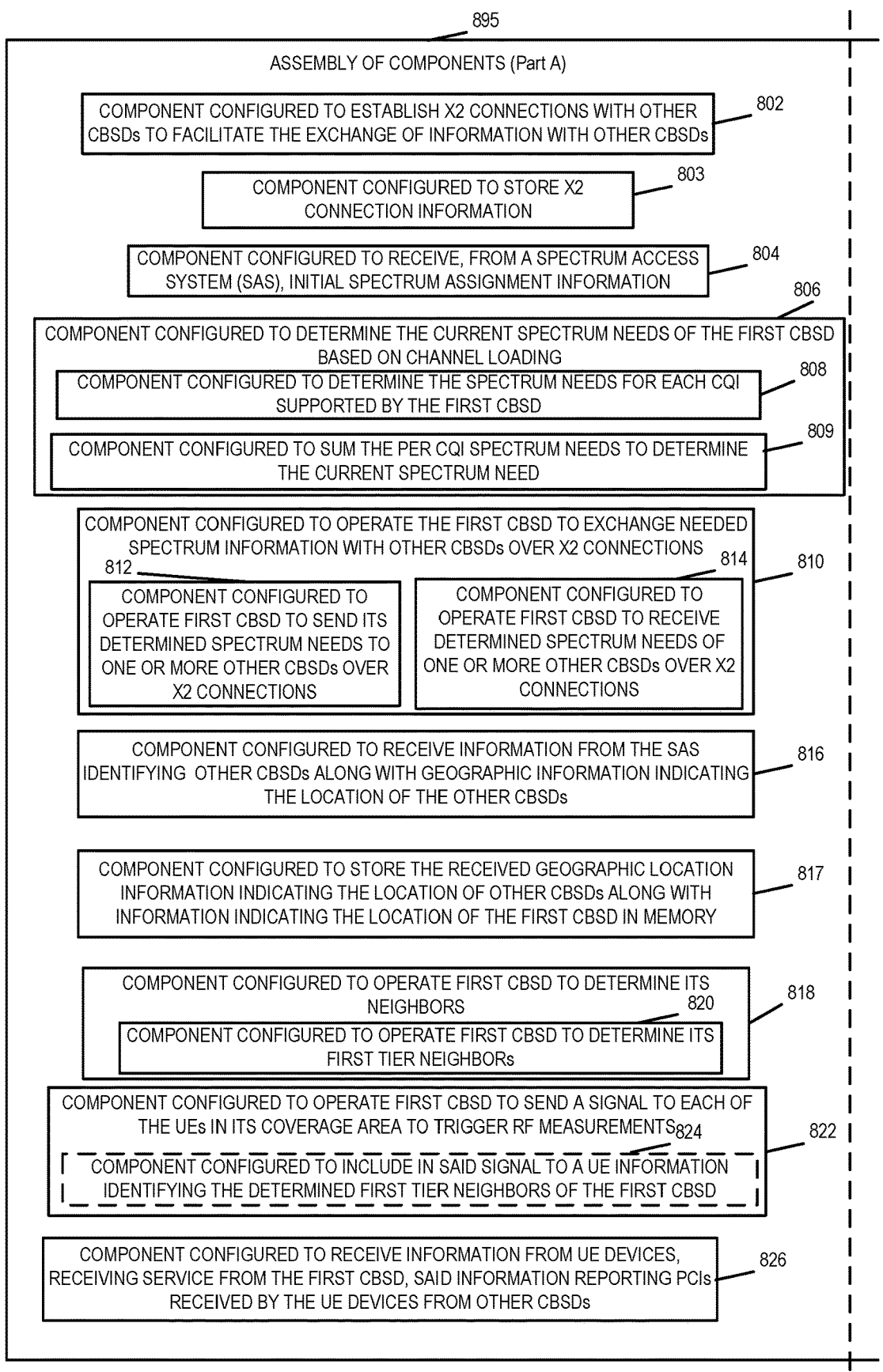
FIG. 8A is a drawing of a first part of an assembly of components, which may be included in and an exemplary first CBSD, in accordance with an exemplary embodiment.
Figure 8B:
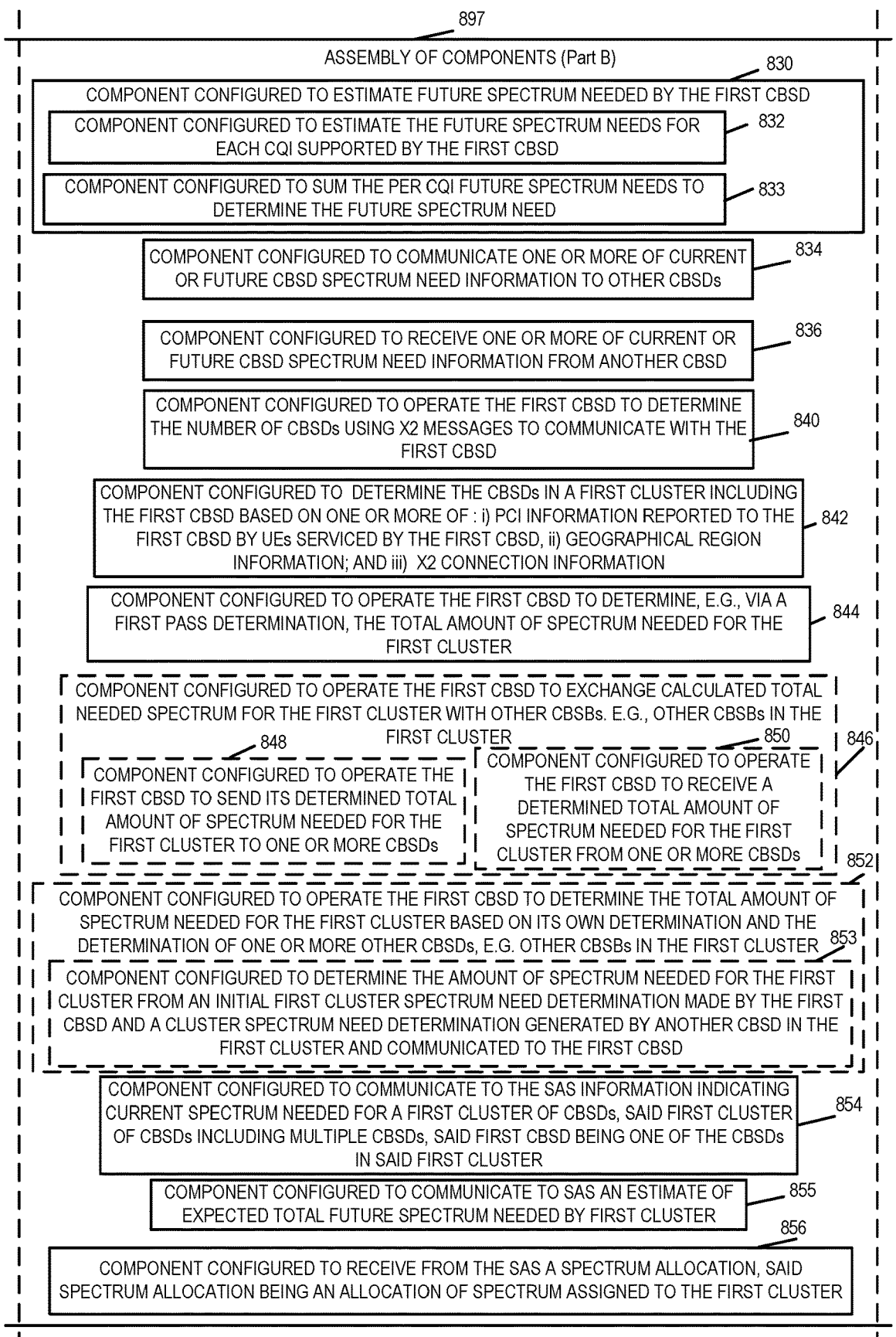
FIG. 8B is a drawing of a second part of an assembly of components, which may be included in and an exemplary first CBSD, in accordance with an exemplary embodiment.

FIG. 8, comprising the combination of FIG. 8A, FIG. 8B and FIG. 8C, is a drawing of an assembly of components 800, comprising the combination of Part A 895, Part B 897 and Part C 899, in accordance with an exemplary embodiment. Exemplary assembly of components 800, may be, and sometimes is, included in a CSBD 700 in accordance with an exemplary embodiment. Assembly of components 800 can be, and in some embodiments is, used in CBSD 1 202, CBSD 2 204, CBSD 3 206, CBSD 4 208, CBSD 5 210, CBSD 6 212, CBSD 1 1202, and/or CBSD 2 1204. The components in the assembly of components 800 can, and in some embodiments are, implemented fully in hardware within the processor 706, e.g., as individual circuits. The components in the assembly of components 800 can, and in some embodiments are, implemented fully in hardware within the assembly of components 708, e.g., as individual circuits corresponding to the different components. In other embodiments some of the components are implemented, e.g., as circuits, within the processor 706 with other components being implemented, e.g., as circuits within assembly of components 708, external to and coupled to the processor 706. As should be appreciated the level of integration of components on the processor and/or with some components being external to the processor may be one of design choice. Alternatively, rather than being implemented as circuits, all or some of the components may be implemented in software and stored in the memory 712 of the CBSD 700, with the components controlling operation of CBSD 700 to implement the functions corresponding to the components when the components are executed by a processor, e.g., processor 706. In some such embodiments, the assembly of components 800 is included in the memory 712 as assembly of components 714. In still other embodiments, various components in assembly of components 800 are implemented as a combination of hardware and software, e.g., with another circuit external to the processor providing input to the processor 706 which then under software control operates to perform a portion of a component's function. While processor 706 is shown in the FIG. 7 embodiment as a single processor, e.g., computer, it should be appreciated that the processor 706 may be implemented as one or more processors, e.g., computers.

When implemented in software the components include code, which when executed by the processor 706, configure the processor 706 to implement the function corresponding to the component. In embodiments where the assembly of components 800 is stored in the memory 712, the memory 712 is a computer program product comprising a computer readable medium comprising code, e.g., individual code for each component, for causing at least one computer, e.g., processor 706, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 8 control and/or configure the CBSD 700 or elements therein such as the processor 706, to perform the functions of corresponding steps illustrated and/or described in the method of one or more of the flowcharts, signaling diagrams and/or described with respect to any of the Figures. Thus the assembly of components 800 includes various components that perform functions of corresponding one or more described and/or illustrated steps of an exemplary method, e.g., steps of the method of flowchart 500 of FIG. 5 and/or described or shown with respect to nay of the other figures.

Assembly of components 800 includes a component 802 configured to establish X2 connections with other CBSDs to facilitate the exchange of information with other CBSDs, a component 803 configured to store X2 connection information, a component 804 configured to receive from a spectrum access system (SAS), initial spectrum assignment information, and a component 806 configured to determine the current spectrum needs of the first CBSD based on channel loading. Component 806 includes a component 808 configured to determine the spectrum needs for each CQI supported by the first CBSD and a component 809 configured to sum the per CQI spectrum needs to determine the current spectrum need for the first CBSD.

Assembly of components 800 further includes a component 810 configured to operate the first CBSD to exchange needed spectrum information with other CBSDs over X2 connections. Component 810 includes a component 812 configured to operate the first CBSD to send its determined spectrum needs to one or more other CBSDs over X2 connections and a component 814 configured to operate the first CBSD to receive determined spectrum needs of one or more other CBSDs over X2 connections.

Assembly of components 800 further includes a component 816 configured to receive information from the SAS identifying other CBSDs along with geographic location information indicating the location of other CBSDs, a component 817 configured to store the received geographic location information indicating the location of other CBSDs along with information indicating the location of the first CBSD in memory, and a component 818 configured to operate the first CBSD to determine its neighbors. Component 818 includes a component 820 configured to operate the first CBSD to determine its first tier neighbors.

Assembly of components 800 further includes a component 822 configured to operate the first CBSD to send a signal to each of the UEs in its coverage area to trigger RF measurements. In some embodiments, component 822 includes a component 824 configured to include in said signal to a UE information identifying the determined first tier neighbors if the first CBSD. Assembly of components 800 further includes a component 826 configured to receive information from UE devices receiving service from the first CBSD, said information reporting PCIs received by the UE devices from other CSBDs.

Assembly of components 800 further includes a component 830 configured to estimate future spectrum needed by the first CBSD. Component 830 includes a component 832 configured to estimate the future spectrum needs for each CQI supported by the first CBSD and a component 833 configured to sum the per CQI future spectrum needs to determine the future spectrum need for the first CBSD.

Assembly of components 800 further includes a component 834 configured to communicate one or more of current or future CBSD spectrum need information to other CBSDs, a component 836 configured to receive one or more of current of future CSBD spectrum need information from another CBSD, and a component 840 configured to operate the first CSBD to determine the number of CBSDs using X2 messages to communicate with the first CBSD. Assembly of components 800 further includes a component 842 configured to determine the CBSDs in a first cluster include the first CBSD based on one or more of: i) PCI information reported to the first CBSD by UEs serviced by the first CSBD, ii) geographical region information, and iii) X2 connection information, and a component 844 configured to operate the first CBSD to determine, e.g., via a first pass determination, the total amount of spectrum needed for the first cluster.

Assembly of components 800 further includes a component 846 configured to operate the first CBSD to exchange calculated total needed spectrum for the first cluster with other CBSDs, e.g., other CBSDs in the first cluster. Component 846 includes a component 848 configured to operate the first CBSD to send its determined total amount of spectrum needed for the first cluster to one of more CBSDs, e.g., to the other CBSDs in the first cluster. Component 846 further includes a component 850 configured to operate the first CBSD to receive a determined total amount of spectrum needed for the first cluster from one of more CBSDs, e.g., from the other CBSDs in the first cluster. Assembly of components 800 further includes a component 852 configured to operate the first CBSD to determine the total amount of spectrum needed for the first cluster based on its own determination and the determination of one or more other CBSDs, e.g. other CBSDs in the first cluster. Component 852 includes a component 853 configured to determine the amount of spectrum needed for the first cluster of CBSDs from an initial first cluster need determination made by the first CBSD and a cluster need determination generated by another CBSD in the first cluster and communicated to the first CBSD.

Assembly of components 800 further includes a component 854 configured to communicate to the SAS information spectrum needed for a first cluster of CBSDS, said first cluster of CBSDs including multiple CBSDs, said first CBSD being one of the CBSDs in the first cluster, a component 855 configured to communicate to a SAS an estimate of expected total future spectrum needed by the first cluster, and a component 856 configured to receive from the SAS a spectrum allocation, said spectrum allocation being an allocation of spectrum assigned to the first cluster.

Assembly of components 800 further includes a component 860 configured to select, from spectrum assigned by the SAS to the first cluster, a first portion of spectrum to be used by the first CBSD, said selecting said first portion including selecting a range of frequencies in the spectrum assigned to the first cluster to be used by the first CBSD, a component 862 configured to communicate to a second CBSD in said first cluster of CBSDs information indicating the spectrum allocated to the first cluster and the first portion, e.g. frequency range, of said spectrum selected by the first CBSD to be used by the first CBSD, and a component 864 configured to use the first portion of the spectrum allocated to the first cluster of CBSDs to communicate with user equipment (UE) devices serviced by the first CBSD.

FIG. 8, comprising the combination of FIG. 8A, FIG. 8B and FIG. 8C, is a drawing of an assembly of components 900, comprising the combination of Part A 995, Part B 997 and Part C 999, in accordance with an exemplary embodiment. Exemplary assembly of components 900 may be, and sometimes is, included in a CSBD 700 in accordance with an exemplary embodiment. Assembly of components 900 can be, and in some embodiments is, used in CBSD 1 202, CBSD 2 204, CBSD 3 206, CBSD 4 208, CBSD 5 210, CBSD 6 212, CBSD 1 1202, and/or CBSD 2 1204. The components in the assembly of components 900 can, and in some embodiments are, implemented fully in hardware within the processor 706, e.g., as individual circuits. The components in the assembly of components 900 can, and in some embodiments are, implemented fully in hardware within the assembly of components 708, e.g., as individual circuits corresponding to the different components. In other embodiments some of the components are implemented, e.g., as circuits, within the processor 706 with other components being implemented, e.g., as circuits within assembly of components 708, external to and coupled to the processor 706. As should be appreciated the level of integration of components on the processor and/or with some components being external to the processor may be one of design choice. Alternatively, rather than being implemented as circuits, all or some of the components may be implemented in software and stored in the memory 712 of the CBSD 700, with the components controlling operation of CBSD 700 to implement the functions corresponding to the components when the components are executed by a processor, e.g., processor 706. In some such embodiments, the assembly of components 900 is included in the memory 712 as assembly of components 714, e.g. an assembly of software components. In still other embodiments, various components in assembly of components 900 are implemented as a combination of hardware and software, e.g., with another circuit external to the processor providing input to the processor 706 which then under software control operates to perform a portion of a component's function. While processor 706 is shown in the FIG. 7 embodiment as a single processor, e.g., computer, it should be appreciated that the processor 706 may be implemented as one or more processors, e.g., computers.

When implemented in software the components include code, which when executed by the processor 706, configure the processor 706 to implement the function corresponding to the component. In embodiments where the assembly of components 900 is stored in the memory 712, the memory 712 is a computer program product comprising a computer readable medium comprising code, e.g., individual code for each component, for causing at least one computer, e.g., processor 706, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 9 control and/or configure the CBSD 700 or elements therein such as the processor 706, to perform the functions of corresponding steps illustrated and/or described in the method of one or more of the flowcharts, signaling diagrams and/or described with respect to any of the Figures. Thus the assembly of components 900 includes various components that perform functions of corresponding one or more described and/or illustrated steps of an exemplary method, e.g., steps of the method of flowchart 600 of FIG. 6 and/or described or shown with respect to nay of the other figures.

Assembly of components 900 includes a component 902 configured to establish X2 connections with other CBSDs to facilitate the exchange of information with other CBSDs, a component 903 configured to store X2 connection information, a component 904 configured to receive from a spectrum access system (SAS), initial spectrum assignment information, and a component 906 configured to determine the current spectrum needs of the second CBSD based on channel loading. Component 906 includes a component 908 configured to determine the spectrum needs for each CQI supported by the second CBSD and a component 909 configured to sum the per CQI spectrum needs to determine the current spectrum need for the second CBSD.

Assembly of components 900 further includes a component 910 configured to operate the second CBSD to exchange needed spectrum information with other CBSDs over X2 connections. Component 910 includes a component 912 configured to operate the second CBSD to send its determined spectrum needs to one or more other CBSDs over X2 connections and a component 914 configured to operate the second CBSD to receive determined spectrum needs of one or more other CBSDs over X2 connections.

Assembly of components 900 further includes a component 916 configured to receive information from the SAS identifying other CBSDs along with geographic location information indicating the location of other CBSDs, a component 917 configured to store the received geographic location information indicating the location of other CBSDs along with information indicating the location of the second CBSD in memory, and a component 918 configured to operate the second CBSD to determine its neighbors. Component 918 includes a component 920 configured to operate the second CBSD to determine its first tier neighbors.

Assembly of components 900 further includes a component 922 configured to operate the second CBSD to send a signal to each of the UEs in its coverage area to trigger RF measurements. In some embodiments, component 922 includes a component 924 configured to include in said signal to a UE information identifying the determined first tier neighbors if the second CBSD. Assembly of components 900 further includes a component 926 configured to receive information from UE devices receiving service from the second CBSD, said information reporting PCIs received by the UE devices from other CSBDs.

Assembly of components 900 further includes a component 930 configured to estimate future spectrum needed by the second CBSD. Component 930 includes a component 932 configured to estimate the future spectrum needs for each CQI supported by the second CBSD and a component 933 configured to sum the per CQI future spectrum needs to determine the future spectrum need for the second CBSD.

Assembly of components 900 further includes a component 934 configured to communicate one or more of current or future CBSD spectrum need information to other CBSDs, a component 936 configured to receive one or more of current of future CSBD spectrum need information from another CBSD, and a component 940 configured to operate the second CSBD to determine the number of CBSDs using X2 messages to communicate with the second CBSD.

Assembly of components 900 further includes a component 942 configured to send information to a first CBSD to determine the CBSDs in a first cluster, said information including one or more of i) PCI information reported to the second CBSD by UEs serviced by the second CSBD, ii) geographical region information, and iii) X2 connection information, and a component 944 configured to operate the second CBSD to determine, e.g., via a first pass determination, the total amount of spectrum needed for the first cluster.

Assembly of components 900 further includes a component 946 configured to operate the second CBSD to exchange calculated total needed spectrum for the first cluster with other CBSDs, e.g., other CBSDs in the first cluster. Component 946 includes a component 948 configured to operate the second CBSD to send its determined total amount of spectrum needed for the first cluster to one of more CBSDs, e.g., to the other CBSDs in the first cluster. Component 946 further includes a component 950 configured to operate the second CBSD to receive a determined total amount of spectrum needed for the first cluster from one of more CBSDs, e.g., from the other CBSDs in the first cluster.

Assembly of components 900 further includes a component 952 configured to operate the second CBSD to receive information from the first CBSD, said information communicating the SAS assigned spectrum for the first cluster and a selected first portion of spectrum to be used by the first CBSD, said selected first portion of spectrum to be used by the first CBSD, said selected first portion of spectrum having been selected by the first CBSD and including a selected range of frequencies in the spectrum assigned to the first cluster to be used by the first CBSD. Assembly of components 900 further includes a component 956 configured to operate the second CBSD to select, from the spectrum assigned by the SAS to the first cluster, a second portion of spectrum to be used by the second CBSD, selecting said second portion of spectrum including selecting a range of frequencies in the spectrum assigned to the first cluster to be used by the second CBSD, said selected frequency range to be used by the second CBSD. Component 956 includes a component 958 configured to operate the second CBSD to determine the remaining available spectrum within the spectrum assigned to the cluster by the first SAS and a component 962 configured to operate the second CBSD to select said second portion of spectrum from the determined remaining available spectrum. Component 958 includes a component 960 configured to remove spectrum within the SAS assigned spectrum for the first cluster which has already been selected for use by another CBSD in the first cluster, e.g., the first CBSD, to determine the remaining available spectrum.

Assembly of components 900 further includes a component 964 configured to operate the second CBSD to send information to a third CBSD in the first cluster, said information communicating the SAS assigned spectrum for the first cluster, the first portion of spectrum selected by the first CBSD and the second portion of spectrum selected by the second CBSD, and a component 966 configured to use a second portion of the spectrum allocated to the first cluster of CBSDs to communicate with user equipment (UE) devices serviced by the second CBSD.

Figures 9, 9C:
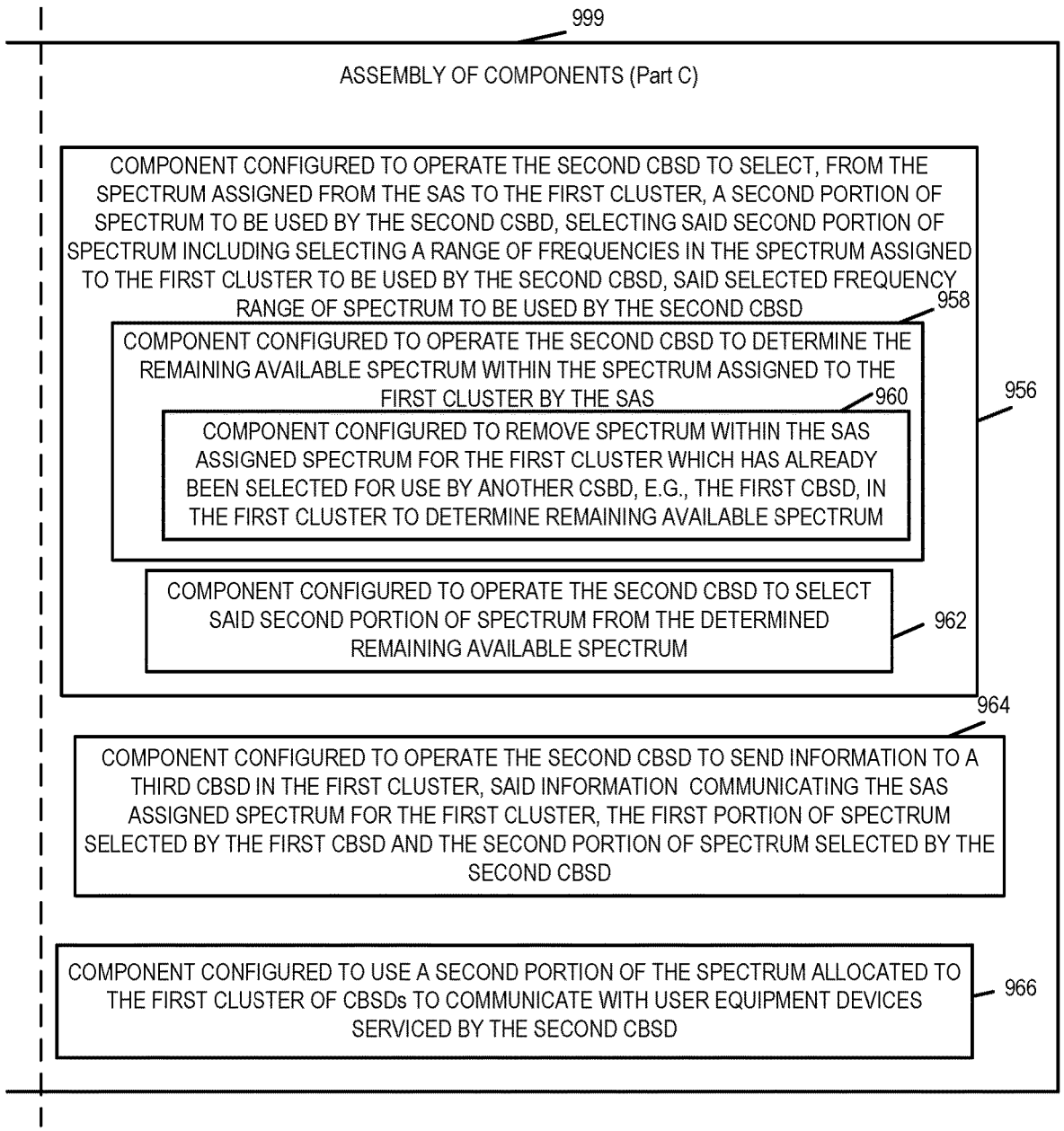
FIG. 9C is a drawing of a third part of an assembly of components, which may be included in and an exemplary second CBSD, in accordance with an exemplary embodiment.
FIG. 9 comprises the combination of FIG. 9A, FIG. 9B and FIG. 9C.
Figure 9A:
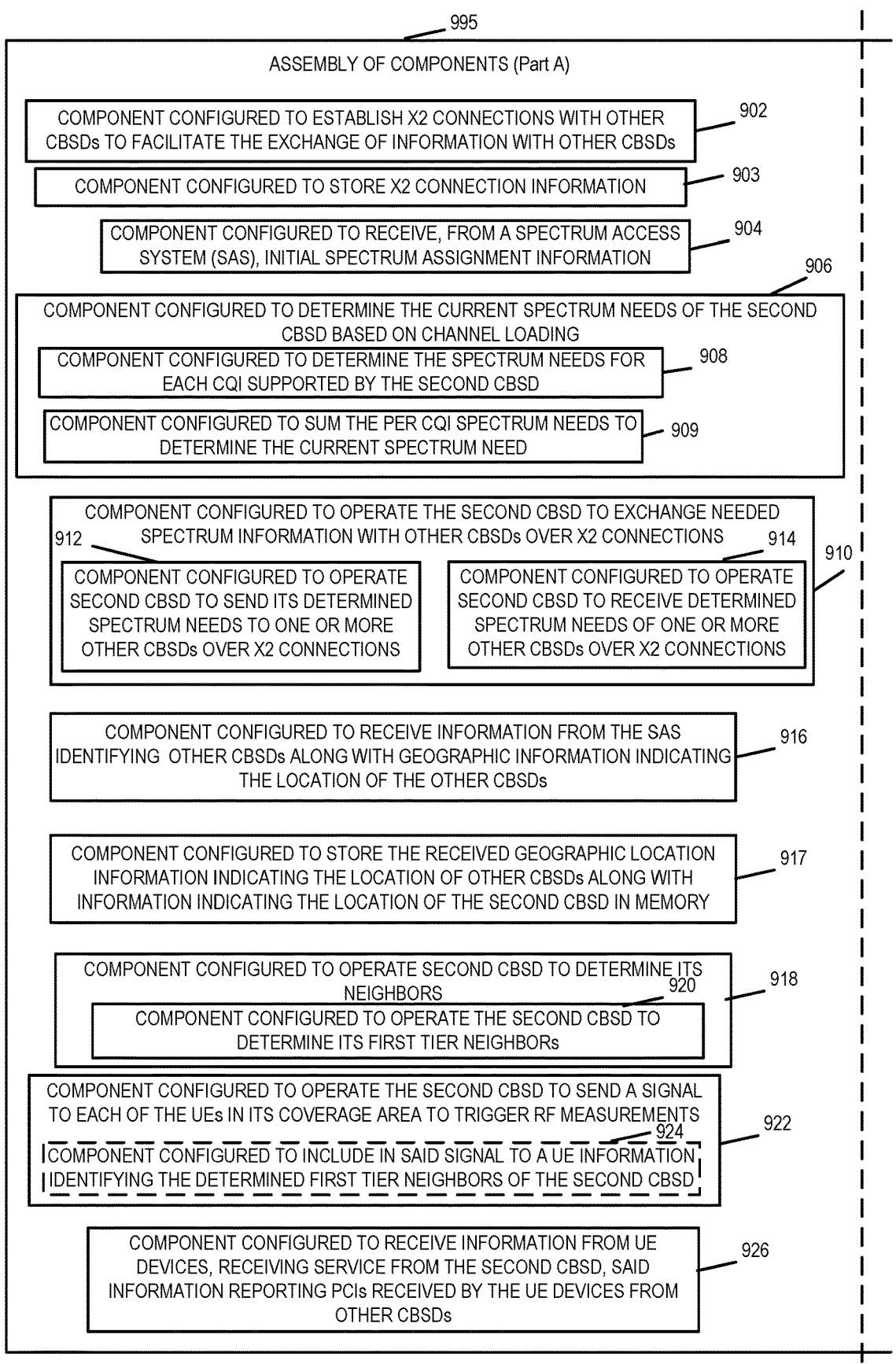
FIG. 9A is a drawing of a first part of an assembly of components, which may be included in and an exemplary second CBSD, in accordance with an exemplary embodiment.
Figure 9B:
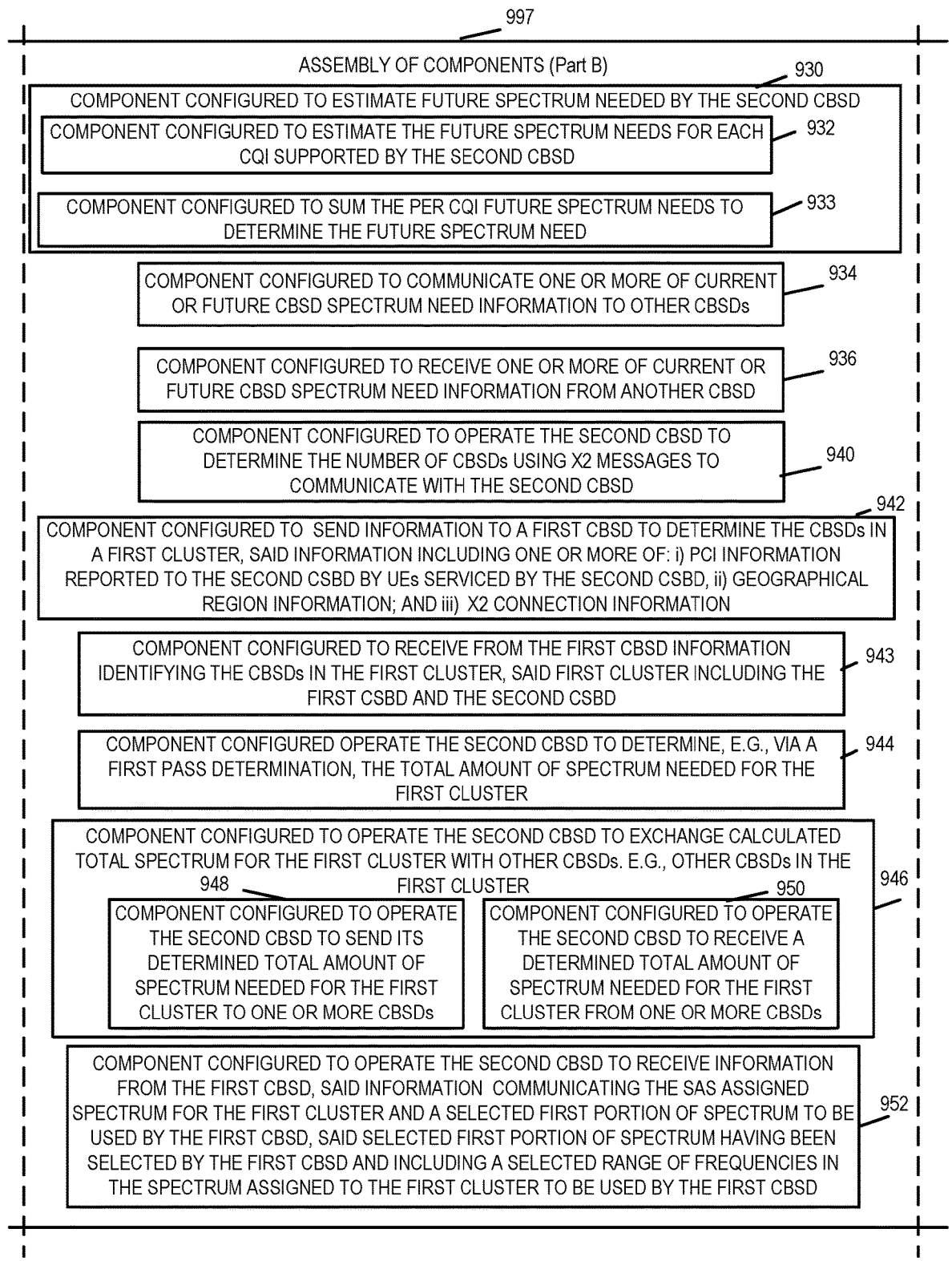
FIG. 9B is a drawing of a second part of an assembly of components, which may be included in and an exemplary second CBSD, in accordance with an exemplary embodiment.

In some embodiments, a CBSD, e.g. CBSD 700 of FIG. 7 includes both assembly of components 800 of FIG. 8 and assembly of components 900 of FIG. 9.

Figure 10:
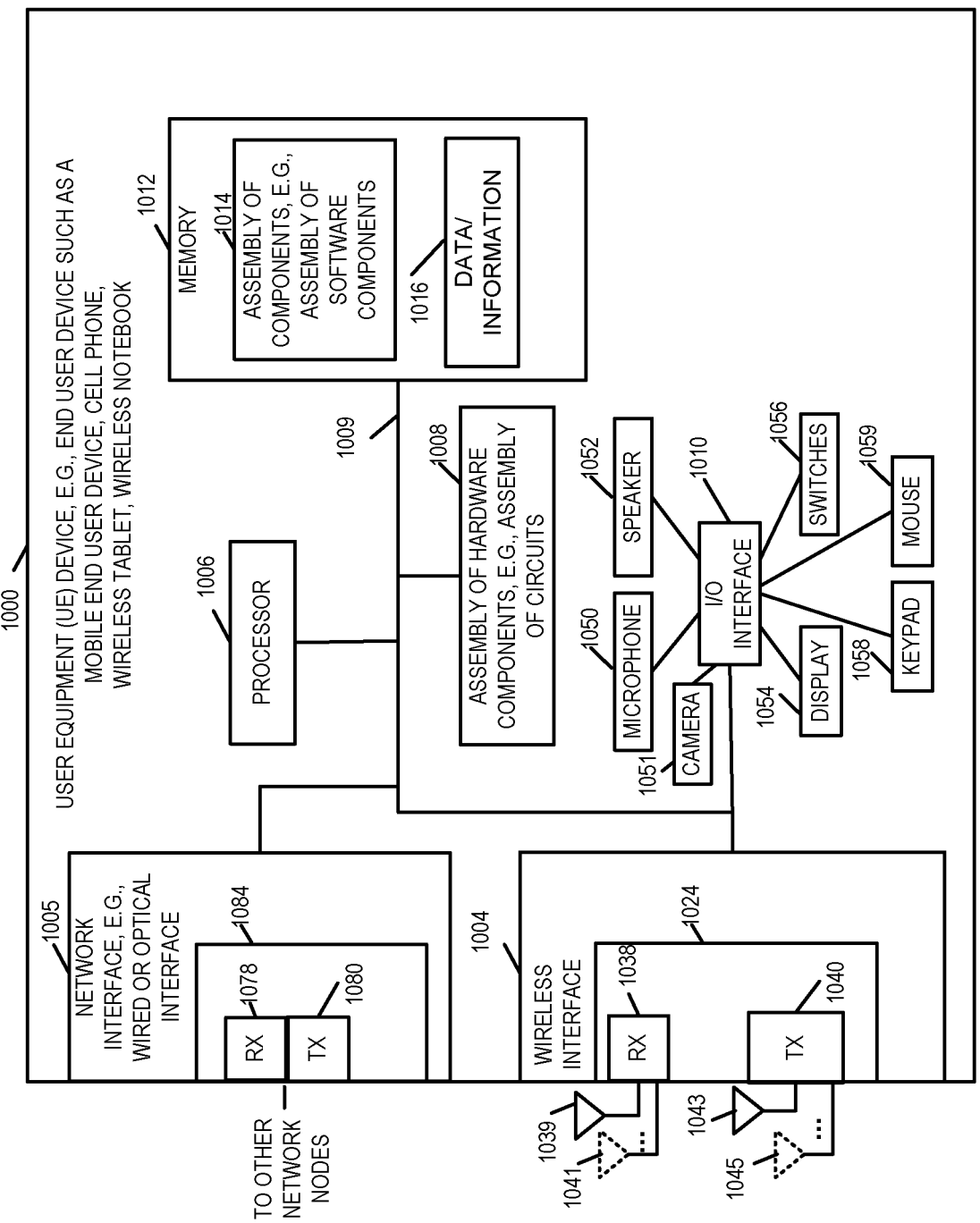
FIG. 10 illustrates details of an exemplary User Equipment (UE) device in accordance with one embodiment of the present invention.

FIG. 10 is a drawing of an exemplary user equipment (UE) device 1000 in accordance with an exemplary embodiment. UE device 1000 is, e.g., a mobile end user device such as a cell phone, a smart phone, wireless tablet or wireless notebook. UE device 1000, in some embodiments, includes Long Term Evolution (LTE), e.g., 4G LTE, mobile device capabilities. Exemplary UE device 1000 includes a wireless interface 1004, a processor 1006, e.g., a CPU, an assembly of hardware components 1008, e.g., an assembly of circuits, and I/O interface 1010 and memory 1012 coupled together via a bus 1009 over which the various elements may interchange data and information. UE device 1000 further includes a microphone 1050, camera 1051, speaker 1052, a display 1054, e.g., a touch screen display, switches 1056, keypad 1058 and mouse 1059 coupled to I/O interface 1010, via which the various I/O devices (1050, 1051, 1052, 1054, 1056, 1058, 1059) may communicate with other elements (1004, 1006, 1008, 1012) of the UE device. Network interface 1005 includes a receiver 1078 and a transmitter 1080. In some embodiments, receiver 1078 and transmitter 1080 are part of a transceiver 1084. Wireless interface 1004 includes a wireless receiver 1038 and a wireless transmitter 1040. In some embodiments, receiver 1038 and transmitter 1040 are part of a transceiver 1024. In various embodiments, wireless interface 1004 includes a plurality of wireless receivers and a plurality of wireless transmitters. Wireless receiver 1038 is coupled to one or more receive antennas (receive antenna 1 1039, . . . , receive antenna M 1041), via which UE device 1000 can receive wireless signals from other wireless communications devices including, e.g., a CBSD device such as CBSD 700. Wireless transmitter 1040 is coupled to one or more wireless transmit antennas (transmit antenna 1 1043, . . . , transmit antenna N 1045) via which the UE device 1000 can transmit signals to other wireless communications device including a first wireless communications device, e.g., a CBSD 700. Memory 1012 includes an assembly of components 1014, e.g., an assembly of software components, and data/information 1016.

Figure 11:
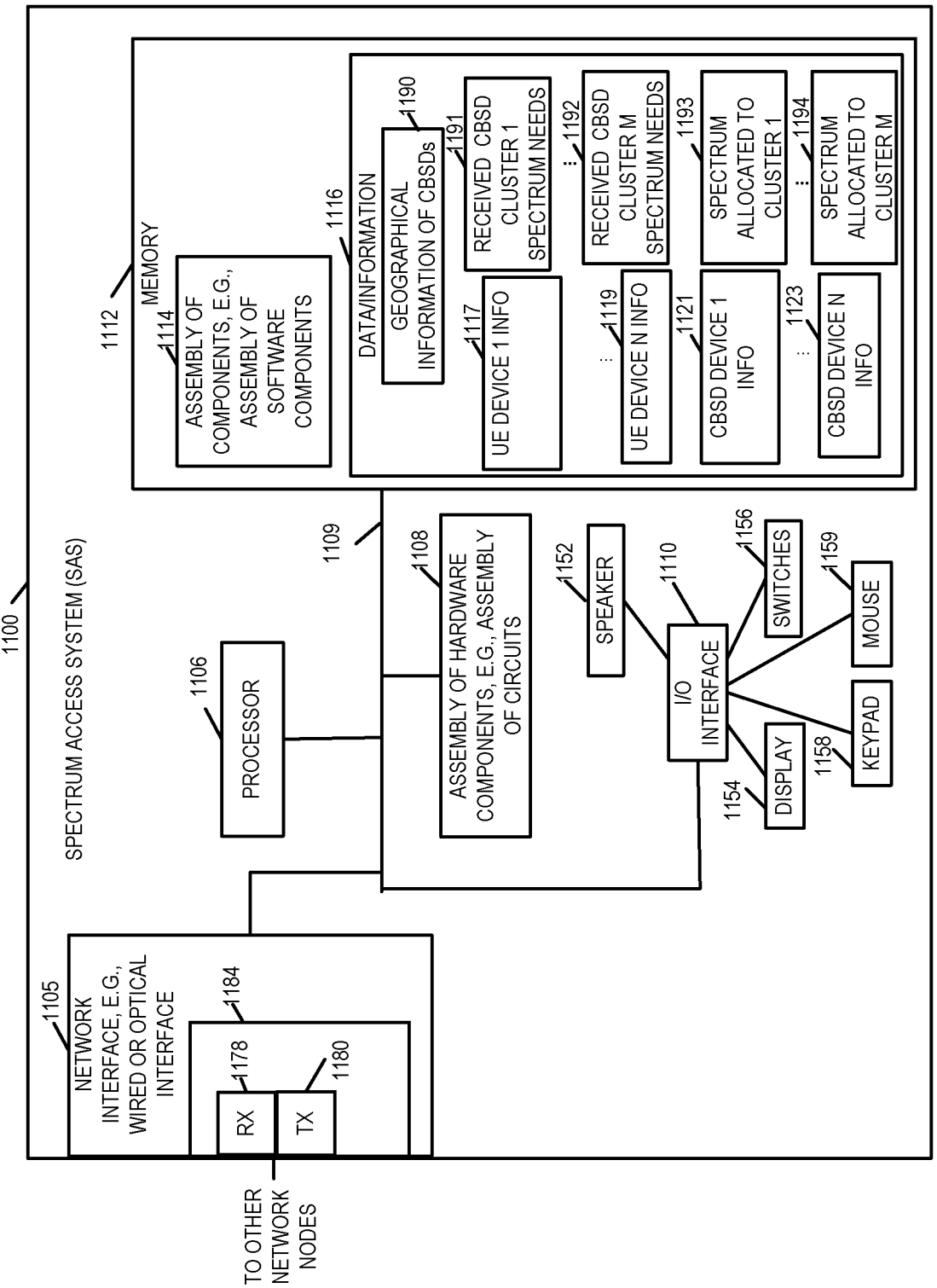
FIG. 11 illustrates details of an exemplary Spectrum Access System device (SAS) in accordance with one embodiment of the present invention.

FIG. 11 is a drawing of an exemplary Spectrum Access System (SAS) device 1100 in accordance with an exemplary embodiment. SAS 1100 is, e.g., SAS 302 of FIG. 3 and/or SAS 1206 or 1207 of FIG. 12. SAS 1100 receives spectrum needs for CBSD clusters and allocates spectrum on a per cluster basis. The SAS 1100 includes the capabilities of a SAS as defined by the Federal Communications Commission's Rules with Regard to Commercial Operations in the 3550-3650 MHz Band. Exemplary SAS device 1100 includes a network interface 1105, e.g., a wired or optical interface, a processor 1106, e.g., a CPU, an assembly of hardware components 1108, e.g., an assembly of circuits, and I/O interface 1110 and memory 1112 coupled together via a bus 1109 over which the various elements may interchange data and information. SAS 1100 further includes a speaker 1152, a display 1154, switches 1156, keypad 1158 and mouse 1159 coupled to I/O interface 1110, via which the various I/O devices (1152, 1154, 1156, 1158, 1159) may communicate with other elements (1106, 1108, 1112) of the SAS 1100. Network interface 1105 includes a receiver 1178 and a transmitter 1180. The network interface 1105 is typically used to communicate with other SAS devices and CBSD devices. In some embodiments, receiver 1178 and transmitter 1180 are part of a transceiver 1184. Memory 1112 includes an assembly of component 1114, e.g., an assembly of software components, and data/information 1116. Data/information 1116 includes UE device information corresponding to a plurality of UE devices (UE device 1 information 1117 . . . UE device N information 1119, where N is integer number. Data/information 1116 further includes geographical information of CBSDs 1190, received spectrum needs on a per CBSD cluster basis (received CBSD cluster 1 spectrum needs 1191, . . . , received CBSD cluster M spectrum needs 1192), and spectrum allocations on a per cluster basis (cluster 1 spectrum allocation 1193, . . . , cluster M spectrum allocation 1194). Data/information 1116 also includes CBSD device information corresponding to a plurality of CBSD devices (CBSD device 1 information 1121, . . . , CBSD device N information 1123, where N is an integer number). Data/Information 1116 also typically includes the UE power headroom and UE timing advance lists, and CBDS device transmission power and spectrum allocation information. In some embodiments, SAS 1 1206 of FIG. 12 is implemented in accordance with SAS 1100.

FIG. 12 illustrates an exemplary CBRS network communications system 1200 having an architecture implemented in accordance with the present invention. The CBRS communications network system 1200 includes a Citizens Broadcast Radio Service Device (CBSD) 1 1202, a CBSD 2 1204, a Spectrum Access System device 1 (SAS 1) 1206, a SAS 2 1207, an FCC Databases of commercial users/licenses 1203, an Environmental Sensing Capability (Federal Incumbent Use) (ESC) system 1205, a plurality of user equipment (UE) devices UE 1 1210, UE 2 1212, UE 3 1214, UE 4 1216, UE 5 1218, UE 6 1220, UE 7 1222, UE 8 1224, and UE 9 1226, communications links 1228, 1238, 1240, 1260, 1262, 1264, 1266, 1268, 1270, 1272, 1274, 1276, 1278, 1280, 1281, 1282, 1284, a first cell 1208 and a second cell 1209.

The first cell 1208 of the CBRS network is serviced by CBSD 1 1202. The first cell 1208 illustrates the wireless coverage range of CBSD 1 1202 at a first time T1. The user equipment devices also sometimes referred to as user terminal devices UE 1 1210, UE 2 1212, UE 3 1214, UE 4 1216, and UE 5 1218 are located in the first cell 1208 are in active wireless communications with CBSD 1 1202. Communications links 1260, 1262, 1264, 1266, and 1268 illustrate wireless communications channels, e.g., radio channels, over which CBSD 1 1202 and UE 1 1210, UE 2 1212, UE 3 1214, UE 4 1216, and UE 5 1218 communicate respectively.

The second cell 1209 of the CBRS network is serviced by CBSD 2 1204. The second cell 1209 illustrates the wireless coverage range of CBSD 2 1204 at the first time T1. The user equipment devices UE 6 1220, UE 7 1222, UE 8 1224 and UE 9 1226 are located in a second cell 1209 and are in communication with CBSD 2 1204. Communications links 1270, 1272, 1274 and 1276 illustrate wireless communications channels, e.g., radio channels, over which CBSD 2 1202 and UE 6 1220, UE 7 1222, UE 8 1224, and UE 9 1226 communicate respectively.

SAS 1 1206 is coupled to SAS 2 1207 via communications link 1278. SAS 1 1206 is coupled to FCC Databases 1203 via communications link 1280. SAS 2 1207 is coupled to FCC Databases 1203 via communications link 1281. ESC system 1205 is coupled to SAS 1 1206 and SAS 2 1207 via communications links 1282 and 1284. The ESC system is used to detect, sense Navy radar operations in CBRS operation within 3550-3650 MHz near the coasts and provide notifications over the communications links to SAS 1 1206 and SAS 2 1207. SAS 1 1206 manages the CBSD 1 1202 and CBSD 2 1204 spectrum allocation and transmission power to limit interference in the CBRS network. SAS 2 1207 manages other CBSDs in the CBRS network which are not shown in FIG. 1. SAS 1 1206 and SAS 2 1207 communicate and share information regarding the CBRS network coverage of the CBSDs each respectively manage and coordinate management of the allocation of spectrum and power transmission levels of CBSDs throughout the CBRS network. While only two SAS devices are shown in FIG. 12 it should be understood that additional SAS devices are typically used in the CBRS network. The communications link 1228 couples CBSD 1 1202 to CBSD 2 104.

The communications links 1228, 1238, 1240, 1278, 1280, 1282, and 1284 are typically wired communications links or fiber optic cables. The communications links 1260, 1262, 1264, 1266, 1268, 1270, 1272, 1274 and 1276 are wireless or over the air communications links. It is to be understood that the communication links shown in system 1200 are only exemplary and other network configurations and communications links may be employed that couple together the devices, servers, nodes, entities, databases and controllers of the system. Elements or steps with the same reference numbers used in different figures are the same or similar and those elements or steps will not be described in detail again.

While for the sake of simplicity in explaining the invention system 1200 only illustrates two active CBSD devices, two SAS devices and a few UE devices, it will be appreciated that system 1200 typically includes a large plurality of active CBSDs in the CBRS network supporting a large plurality of UE devices and being managed by a plurality of SAS devices which are in communication with one another.

In FIG. 12, exemplary CBSD 1 1202 and CBSD 2 1204 are part of a first cluster of CBSDs 1250 being serviced by SAS 1 1206. There are a plurality of clusters of CBSDs, e.g., M clusters of CBSDs, being serviced by SAS 1 1206, including cluster 1 1250 and cluster M 1251. The CBSDs in system 1200 of FIG. 12, which include CBSD 1202 and CBSD 1204, implement the methods of flowchart 500 of FIG. 5 and/or flowchart 600 of FIG. 6.

Various features and/or aspects of some embodiments of the present invention are further discussed below. Methods and apparatus of allocating partial and bulk spectrum in Citizens Broadband Radio Service (CBRS) network are described. An exemplary method includes assigning spectrum to a group or a cluster of Citizens Broadband Service Devices, e.g. in a particular geographical region. An exemplary method includes communicating spectrum needs corresponding to a group or a cluster of Citizens Broadband Service Devices, e.g. in a particular geographical region, and receiving assigned spectrum corresponding to the group or the cluster of Citizens Broadband Service Devices.

In some embodiments, spectrum is assigned to a cluster of CBSDs.

In some embodiments, each CBSD determines its needs using the following network parameters: i) number of users per CBSD parameters, ii) number of physical resource blocks (PRB) per CBSD parameters, and iii) number of different Bearer types parameters. The number of users per CBSD parameters includes; an average number of users per CBSD, a peak number of users per CBSD, an average number of users per sector, if the CBSD is sectoirized, peak number of users per sector, if the CBSD is sectorized, and a standard deviation of the number of users. The number of PRBs used per CBSD parameters includes: an average number of PRBs used per CBSD, an average number of PRBs per sector, if the CBSD is sectorized, a peak number of PRBs used per CBSD, a peak number of PRBs per sector, if the CBSD is sectorized, a standard deviation of the number of PRBs used per CBSD, and a standard deviation of the number of PRBs per sector, is CBSD is sectorized. The number of different bearer types parameters includes a total number of each bearer type in the network (QCI1, QCI2, QCI8, QCI9).

In some embodiments, each CBSD will calculate the numbers for the network parameters: i) number of users per CBSD parameters, ii) number of physical resource blocks (PRB) per CBSD parameters, and iii) number of different Bearer types parameters, e.g. during a pre-determined time window. The CBSDs will exchange this information among themselves. In various embodiments, having an X2 connection with another CBSD is not sufficient to be included in a cluster of CBSDs which collaboratively decide the amount of spectrum needed in the cluster of which the CBSD is a part of.

In some embodiments, in addition to X2 links among CBSDs, the following information: i) geographic location of each CBSD and ii) Physical channel information (PCI) reports from user terminals, e.g. UEs, can be, and sometimes is, used. In some embodiments, an SAS sends each CSBD information communicating its geographical neighbors. With this information, in some embodiments, each CBSD determines its first tier neighbors. CBSDs will trigger the RF measurement on each UE in its coverage; and each UE will report PCIs of other CBSDs in the first tier.

In some embodiments, each CBSD will calculate the current spectrum need per Quality Channel Indicator (QCI), e.g. based on the following formula: Current Spectrum Amount per QCI=(Average number of PRBs Used per QCI type)*(Standard deviation of PRBs used per QCI type). In some embodiments, each CBSD will calculate the Future Spectrum Demand per Quality Channel Indicator (QCI), e.g. based on the following formula: Future spectrum Demand per QCI=((Average number of PRBs Used per QCI type)/ (Average number of UEs per QCI type))*(Standard deviation of Number of Users per QCI type).

In some embodiments, the standard deviation will be calculated as follows: 1) first take into account all the data points, 2) calculate the average for all the data points, 3) calculate the standard deviation of these data points, 4) find points that fall outside of (average+3 standard deviation) and (average−3 standard deviation) and remove these data points from the set, and 5) calculate the standard deviation of the new data set, and this is the standard deviation that is used in each of the calculations, e.g., including the current spectrum amount per QCI calculation and Future spectrum Demand per QCI calculation.]

In some embodiments, each CSBD sends its "Future Spectrum Demand per QCI' to its neighbor CSBSm and each CSBD will calculate the total amount of spectrum needed in its cluster. In some embodiments, each CBSD will determine the number of CBSDss in its cluster, e.g., based on the number of X2 messages it receives from other CBSDs. In some embodiments, each CBSD will calculate the total 'Future Spectrum Demand (FSD) of its cluster in terms of the Total Number of PRBs, and match this number to a real spectrum asset, e.g., using a FSD to real spectrum asset mapping table, e.g., such as exemplary table 400 of FIG. 4.

In some embodiments, each CBSD will determine the total amount of spectrum needed in its cluster, and will send this information to other CBSDs over X2. In some embodiments, only one of the CBSD in a particular cluster will send a determined total amount of spectrum needed for that particular cluster to the SAS. In some other embodiments, multiple CBSDs in a particular cluster will each send a determined total amount of spectrum needed for that particular cluster to the SAS. In some other embodiments, each CBSD in a cluster will send a determined total amount of spectrum needed for that its cluster to the SAS.

The SAS will receive cluster need information and the save the information for each cluster. In various embodiments, when assigning spectrum, the SAS will send the spectrum allocation for a cluster to only one CBSD in a cluster. Drawing 300 of FIG. 3 can be used for the following example. For example, the SAS 302 can send 25 MHZ of spectrum to a cluster, e.g., cluster 1 226, of 3 CBSDs (CBSD 1 202, CBSD 2 204, CBSD 3 206_. In this example, the SAS 302 allocated the full amount of spectrum to satisfy the needs of the cluster, which were communicated to the SAS 302. Once the SAS 302 sends the total amount of needed spectrum of 25 MHz to CBSD1 202, CBSD1 202 will select 10 MHz worth of frequency range, and will send this information and its own frequency information to CBSD2 204. CBSD 2 204 will select frequency range worth of 5 MHz, and CBSD 2 204 will send this information and its own spectrum allocation information to CBSD 3 206. CBSD 3 206 will receive frequency range worth of 10 MHz. In essence, the 25 MHz worth of total assigned spectrum will be shared among CBSDs (202, 204, 206) through self-coordination, and inter-communications over X2 interface.

In some embodiments, a CBSD becomes part of a cluster based on the PCI and geographical information of the CBSD. A CBSD should only be part of only one cluster at a particular time. Once a CBSD becomes part of a cluster, the amount of spectrum needed for the cluster will be assigned to that cluster by including each CBSD in the cluster. In some embodiments, a maximum area and a maximum size of a cluster are determined. For instance, in some embodiments, CBSD clusters in a particular region of a particular city include a maximum of 25 CBSDs and cover 10000 sq. ft. In some embodiments, the maximum area and maximum size of a cluster is entered and stored into the SAS for each city and/or state and/or geographical region.

Numbered List of Exemplary Method Embodiments

Method Embodiment 1

A method of operating a first citizens broadband radio service (CBRS) device (CBSD), the method comprising: communicating (554) to a spectrum access system (SAS) information indicating current spectrum needed for a first cluster of CBSDs, said first cluster of CBSDs including multiple CBSDs, said first CBSD being one of the CBSDs in said first cluster; receiving (556) from the SAS a spectrum allocation, said spectrum allocation being an allocation of spectrum assigned to the first cluster; and using (564) a first portion of the spectrum allocated to the first cluster of CBSDs to communicate with user equipment (UE) devices serviced by the first CBSD (in some embodiments the use of the first portion of the spectrum allocated to the first cluster is performed without using one or more additional portions of the spectrum allocated to the first cluster which are to be left available for use by other CBSDs in the first cluster).

Method Embodiment 2

The method of Method Embodiment 1, further comprising: selecting (560) from spectrum assigned from the SAS to the first cluster, the first portion of the spectrum to be used by the first CBSD, selecting said first portion including selecting a range of frequencies in the spectrum assigned to the first cluster to be used by the first CBSD.

Method Embodiment 3

The method of Method Embodiment 2, further comprising: communicating (562) to a second CBSD in said first cluster of CBSDs information indicating the spectrum allocated to the first cluster and the first portion (e.g., frequency range) of said spectrum selected by the first CBSD to be used by the first CBSD.

Method Embodiment 4

The method of Method Embodiment 3, further comprising: determining (544, 552, 553) (note that steps 546 including steps 548 and 550 and step 552 including step 553 which relate to exchanging and updating of cluster need determination are optional steps and one or more of these steps are performed in some but not all embodiments) prior to communicating to the SAS information indicating current spectrum needed for the first cluster of CBSDs, the total amount of spectrum current needed by the first cluster.

Method Embodiment 5

The method of Method Embodiment 4, further comprising: determining (506) the current spectrum needs of the first CBSD based channel loading.

Method Embodiment 6

The method of Method Embodiment 5, wherein determining (506) the current spectrum needs of the first CBSD includes determining (508) the spectrum needs for each CQI supported by the first CBSD and summing (509) the per CQI spectrum needs to determine the current spectrum need.

Method Embodiment 7

The method of Method Embodiment 5, further comprising: estimating (530) future spectrum needed by the first CBSD; communicating (534) one or more of current or future CBRS spectrum need information to other CBSDs; and receiving (536) one or more of current or future CBSD spectrum need information from another CBSD.

Method Embodiment 8

The method of Method Embodiment 7, further comprising: determining (553) the amount of spectrum needed for the first cluster from an initial first cluster spectrum need determination made by the first CBSD and a cluster spectrum need determination generated by another CBSD in the first cluster and communicated to the first CBSD (e.g., pick the largest cluster spectrum need determination that is made by any of the CBSDs in the first cluster to report to the SAS to be on the safe side in ensuring that the spectrum needs of the first cluster will be satisfied if the SAS grants the full request (wherein this is the amount that is reported when steps 552 and 553 are implemented)).

Method Embodiment 9

The method of Method Embodiment 2, further comprising: communicating (555) to the SAS an estimate of the expected total future spectrum needs for the first cluster (e.g., an estimate of the spectrum needs which are likely to be required for the period of time prior to the next allocation period. This may be, and sometimes is, based on rate at which UEs are making/terminating wireless connections with the CBSDs in the first cluster and/or other loading information that can be used to predict expected future spectrum needs.)

Method Embodiment 10

The method of Method Embodiment 9, wherein the spectrum allocated to said first cluster is an amount of spectrum based on the current and future spectrum needs of the first cluster reported to the SAS (and in at least some cases where the future spectrum need is indicated to be larger than the current spectrum need to allow for the predicted future increase in spectrum need).

Method Embodiment 11

The method of Method Embodiment 2, further comprising: determining (542) the CBSDs in the first cluster based on one or more (in spec say one, multiple ones of or all) of: i) PCI information reported to the first CBSD by UEs serviced by the first CBSD, ii) geographical region information (e.g. which CBSDs are in the same geographical region as the first CBSD) known to the CBSD or communicated to the CBSD by the SAS or iii) X2 connection information (e.g., which CBSDs have X2 connections with the first CBSD).

Method Embodiment 12

The method of Method Embodiment 11, further comprising: receiving (526), prior to determining the CBSDs in the first cluster, information from UE devices, receiving service from the first CBSD, said information reporting PCIs received by the UE devices from other CBSDs (this allows the first CBSD to become aware of other CBSDs which are in communication range of UEs being serviced by the first CBSD and thus which are near the first CBSD at least in terms of radio coverage area).

Method Embodiment 13

The method of Method Embodiment 11, further comprising: receiving (516), prior to determining the CBSDs in the first cluster, information from the SAS identifying other CBSDs along with geographic information indicating the location of the other CBSDs; and storing (517) the received geographic location information indicating the location of other CBSDs along with information indicating the location of the first CBSD in memory.

Method Embodiment 14

The method of Method Embodiment 11, further comprising: establishing (502) X2 connections with other CBSDs to facilitate the exchange of information with other CBSDs; and storing (502) X2 connection information (e.g., for use in making cluster membership determination as well as to facilitate communication with other CBSDs).

Numbered List of Exemplary Apparatus Embodiments

Apparatus Embodiment 1

A first citizens broadband radio service (CBRS) device (CBSD) (700) comprising: a receiver (778); and a processor (706) configured to: operate the first CBSD to communicate (554) to a spectrum access system (SAS) information indicating current spectrum needed for a first cluster of CBSDs, said first cluster of CBSDs including multiple CBSDs, said first CBSD being one of the CBSDs in said first cluster; control said receiver to receive (556) from the SAS a spectrum allocation, said spectrum allocation being an allocation of spectrum assigned to the first cluster; and operate the first CBSD to use (564) a first portion of the spectrum allocated to the first cluster of CBSDs to communicate with user equipment (UE) devices serviced by the first CBSD (in some embodiments the use of the first portion of the spectrum allocated to the first cluster is performed without using one or more additional portions of the spectrum allocated to the first cluster which are to be left available for use by other CBSDs in the first cluster).

Apparatus Embodiment 2

The first CBSD (700) of Apparatus Embodiment 1, wherein said processor (706) is further configure to: select (560) from spectrum assigned from the SAS to the first cluster, the first portion of the spectrum to be used by the first CBSD, selecting said first portion including selecting a range of frequencies in the spectrum assigned to the first cluster to be used by the first CBSD.

Apparatus Embodiment 3

The first CBSD (700) of Apparatus Embodiment 2, wherein said processor (706) is further configured to: operate the first CBSD to communicate (562) to a second CBSD in said first cluster of CBSDs information indicating the spectrum allocated to the first cluster and the first portion (e.g., frequency range) of said spectrum selected by the first CBSD to be used by the first CBSD.

Apparatus Embodiment 4

The first CBSD (700) of Apparatus Embodiment 3, further wherein said processor (706) is further configured to: determine (544, 552, 553) (note that steps 546 including steps 548 and 550 and step 552 including step 553 which relate to exchanging and updating of cluster need determination are optional steps and one or more of these steps are performed in some but not all embodiments) prior to communicating to the SAS information indicating current spectrum needed for the first cluster of CBSDs, the total amount of spectrum current needed by the first cluster.

Apparatus Embodiment 5

The first CBSD (700) of Apparatus Embodiment 4, wherein said processor (706) is further configured to: determine (506) the current spectrum needs of the first CBSD based channel loading.

Apparatus Embodiment 6

The first CBSD (700) of Apparatus Embodiment 5, wherein said processor (706) is configured to: determine (508) the spectrum needs for each CQI supported by the first CBSD and sum (509) the per CQI spectrum needs to determine the current spectrum need, as part of being configured to determine (506) the current spectrum needs of the first CBSD includes Apparatus Embodiment 7

The first CBSD (700) of Apparatus Embodiment 5, wherein said processor (706) is further configured to: estimate (530) future spectrum needed by the first CBSD; operate the first CBSD to communicate (534) one or more of current or future CBRS spectrum need information to other CBSDs; and operate said receiver to receive (536) one or more of current or future CBSD spectrum need information from another CBSD.

Apparatus Embodiment 8

The first CBSD (700) of Apparatus Embodiment 7, wherein said processor (706) is further configured to: determine (553) the amount of spectrum needed for the first cluster from an initial first cluster spectrum need determination made by the first CBSD and a cluster spectrum need determination generated by another CBSD in the first cluster and communicated to the first CBSD (e.g., pick the largest cluster spectrum need determination that is made by any of the CBSDs in the first cluster to report to the SAS to be on the safe side in ensuring that the spectrum needs of the first cluster will be satisfied if the SAS grants the full request (wherein this is the amount that is reported when steps 552 and 553 are implemented)).

Apparatus Embodiment 9

The first CBSD (700) of Apparatus Embodiment 2, wherein said processor (706) is further configured to: operate the first CBSD to communicate (555) to the SAS an estimate of the expected total future spectrum needs for the first cluster (e.g., an estimate of the spectrum needs which are likely to be required for the period of time prior to the next allocation period. This may be, and sometimes is, based on rate at which UEs are making/terminating wireless connections with the CBSDs in the first cluster and/or other loading information that can be used to predict expected future spectrum needs.)

Apparatus Embodiment 10

The first CBSD (700) of Apparatus Embodiment 9, wherein the spectrum allocated to said first cluster is an amount of spectrum based on the current and future spectrum needs of the first cluster reported to the SAS (and in at least some cases where the future spectrum need is indicated to be larger than the current spectrum need to allow for the predicted future increase in spectrum need).

Apparatus Embodiment 11

The first CBSD (700) of Apparatus Embodiment 2, wherein said processor (706) is further configured to: determine (542) the CBSDs in the first cluster based on one or more (in spec say one, multiple ones of or all) of: i) PCI information reported to the first CBSD by UEs serviced by the first CBSD, ii) geographical region information (e.g. which CBSDs are in the same geographical region as the first CBSD) known to the CBSD or communicated to the CBSD by the SAS or iii) X2 connection information (e.g., which CBSDs have X2 connections with the first CBSD).

Apparatus Embodiment 12

The CBSD (700) of Apparatus Embodiment 11, further comprising: a wireless receiver (738); and wherein said processor (706) is further configured to control said wireless receiver (738) to: receive (526), prior to determining the CBSDs in the first cluster, information from UE devices, receiving service from the first CBSD, said information reporting PCIs received by the UE devices from other CBSDs (this allows the first CBSD to become aware of other CBSDs which are in communication range of UEs being serviced by the first CBSD and thus which are near the first CBSD at least in terms of radio coverage area).

Apparatus Embodiment 13

The first CBSD (700) of Apparatus Embodiment 11, further comprising: memory (712) coupled to said processor (706); and wherein said processor (706) is further configured to: operate said receiver (778) to receive (516), prior to determining the CBSDs in the first cluster, information from the SAS identifying other CBSDs along with geographic information indicating the location of the other CBSDs; and store (517) the received geographic location information indicating the location of other CBSDs along with information indicating the location of the first CBSD in said memory (712).

Apparatus Embodiment 14

The first CBSD (700) of Apparatus Embodiment 11, wherein said processor (706) is further configured to: establish (502) X2 connections with other CBSDs to facilitate the exchange of information with other CBSDs; and store (502) X2 connection information (e.g., for use in making cluster membership determination as well as to facilitate communication with other CBSDs).

Numbered List of Exemplary Computer Readable Medium Embodiments

Computer Readable Medium Embodiment 1

A non-transitory computer readable medium (712) including a first set of computer executable instructions which when executed by a processor (706) of a first citizens broadband radio service (CBRS) device (CBSD) (700) cause first CBSD (700) to perform the steps of; communicating (554) to a spectrum access system (SAS) information indicating current spectrum needed for a first cluster of CBSDs, said first cluster of CBSDs including multiple CBSDs, said first CBSD being one of the CBSDs in said first cluster; receiving (556) from the SAS a spectrum allocation, said spectrum allocation being an allocation of spectrum assigned to the first cluster; and using (564) a first portion of the spectrum allocated to the first cluster of CBSDs to communicate with user equipment (UE) devices serviced by the first CBSD.

The techniques of various embodiments may be implemented using software, hardware and/or a combination of software and hardware. Various embodiments are directed to apparatus, e.g., CBSD, user equipment devices, SAS, Serving Gateway, PDN gateway, servers, mobility management entities, network nodes, and/or network equipment devices. Various embodiments are also directed to methods, e.g., method of controlling and/or operating CBSD devices, network nodes, SAS, nodes, servers, user equipment devices, controllers, mobility management entities or network equipment devices. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order, and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of elements or steps are implemented using hardware circuitry.

In various embodiments devices, servers, nodes and/or elements described herein are implemented using one or more components to perform the steps corresponding to one or more methods, for example, message reception, signal processing, sending, comparing, determining and/or transmission steps. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more devices, servers, nodes and/or elements. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a controller, including a processor configured to implement one, multiple or all of the steps of one or more methods of the invention.

In some embodiments, the processor or processors, e.g., CPUs, of one or more devices, e.g., communications nodes such as CBSD, UEs, and SAS are configured to perform the steps of the methods described as being performed by the CBSD, UEs, SAS. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., CBSD, UE, SAS, with a processor which includes a component corresponding to each of the steps of the various described methods performed by the device in which the processor is included. In some but not all embodiments a device, e.g., CBSD, UE, SAS, includes a controller corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a CBSD, UE, SAS. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as a CBSD, UE or other device described in the present application.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A method of operating a first citizens broadband radio service (CBRS) device (CBSD), the method comprising:
   determining the current spectrum needs of the first CBSD based on channel loading;
   estimating future spectrum needed by the first CBSD;
   communicating one or more of current or future CBRS spectrum need information to other CBSDs;
   receiving one or more of current or future CBSD spectrum need information from another CBSD;
   determining the amount of spectrum currently needed by a first cluster of CBSDs, said first cluster of CBSDs including multiple CBSDs, said first CBSD being one of the CBSDs in said first cluster of CBSDs;
   communicating to a spectrum access system (SAS) information indicating current spectrum needed for the first cluster of CBSDs, said information indicating current spectrum needed for the first cluster of CBSDs being based on said received one or more of current or future CBSD spectrum need information from said another CBSD;
   receiving from the SAS a spectrum allocation, said spectrum allocation being an allocation of spectrum assigned to the first cluster of CBSDs;
   selecting from spectrum assigned from the SAS to the first cluster of CBSDs, a first portion of the spectrum to be used by the first CBSD, selecting said first portion including selecting a range of frequencies in the spectrum assigned to the first cluster of CBSDs to be used by the first CBSD;
   communicating to a second CBSD in said first cluster of CBSDs information indicating the spectrum allocated to the first cluster of CBSDs and the first portion of said spectrum selected by the first CBSD to be used by the first CBSD; and
   using the first portion of the spectrum allocated to the first cluster of CBSDs to communicate with user equipment (UE) devices serviced by the first CBSD.

2. The method of claim 1,
   wherein determining the amount of spectrum currently needed by the first cluster of CBSDs is based on: i) the current spectrum needs of the first CBSD and ii) a cluster spectrum need determination generated by another CBSD in the first cluster of CBSDs which was communicated to the first CBSD.

3. The method of claim 1, further comprising:
   communicating to the SAS an estimate of the expected total future spectrum needs for the first cluster of CBSDs.

4. The method of claim 1, further comprising:
determining the CBSDs in the first cluster of CBSDs based on one or more of: i) Physical Cell Identifier (PCI) information reported to the first CBSD by UEs serviced by the first CBSD, ii) geographical region information known to the first CBSD or communicated to the first CBSD by the SAS or iii) X2 connection information.

5. The method of claim 4, further comprising:
receiving, prior to determining the CBSDs in the first cluster of CBSDs, information from the SAS identifying other CBSDs along with geographic information indicating the locations of the other CBSDs; and
storing the received geographic location information indicating the locations of other CBSDs along with information indicating the location of the first CBSD in memory.

6. The method of claim 4, further comprising:
establishing X2 connections with other CBSDs to facilitate the exchange of information with other CBSDs; and
storing X2 connection information.

7. A method of operating a first citizens broadband radio service (CBRS) device (CBSD), the method comprising:
receiving information from user equipment (UE) devices, receiving service from the first CBSD, said information reporting Physical Cell Identifiers (PCIs) received by the UE devices from other CBSDs;
determining CBSDs in a first cluster of CBSDs based on one or more of: i) Physical Cell Identifier (PCI) information reported to the first CBSD by UEs serviced by the first CBSD, ii) geographical region information known to the first CBSD or communicated to the first CBSD by a spectrum access system (SAS) or iii) X2 connection information, said first cluster of CBSDs including multiple CBSDs, said first CBSD being one of the CBSDs in said first cluster of CBSDs;
estimating future spectrum needed by the first CBSD;
communicating one or more of current or future CBRS spectrum need information to other CBSDs;
receiving one or more of current or future CBSD spectrum need information from another CBSD;
communicating to the SAS information indicating current spectrum needed for the first cluster of CBSDs, said information indicating current spectrum needed for the first cluster of CBSDs being based on said received one or more of current or future CBSD spectrum need information from said another CBSD;
receiving from the SAS a spectrum allocation, said spectrum allocation being an allocation of spectrum assigned to the first cluster of CBSDs;
selecting from spectrum assigned from the SAS to the first cluster of CBSDs, a first portion of the spectrum to be used by the first CBSD, selecting said first portion including selecting a range of frequencies in the spectrum assigned to the first cluster of CBSDs to be used by the first CBSD; and
using the first portion of the spectrum allocated to the first cluster of CBSDs to communicate with user equipment (UE) devices serviced by the first CBSD.

8. A first citizens broadband radio service (CBRS) device (CBSD) comprising:
a receiver; and
a processor configured to:
determine the current spectrum needs of the first CBSD based on channel loading;
estimate future spectrum needed by the first CBSD;
operate the first CBSD to communicate one or more of current or future CBRS spectrum need information to other CBSDs;
operate said receiver to receive one or more of current or future CBSD spectrum need information from another CBSD;
determine the amount of spectrum currently needed by a first cluster of CBSDs, said first cluster of CBSDs including multiple CBSDs, said first CBSD being one of the CBSDs in said first cluster of CBSDs;
operate the first CBSD to communicate to a spectrum access system (SAS) information indicating current spectrum needed for the first cluster of CBSDs, said information indicating current spectrum needed for the first cluster of CBSDs being based on said received one or more of current or future CBSD spectrum need information from another CBSD;
control said receiver to receive from the SAS a spectrum allocation, said spectrum allocation being an allocation of spectrum assigned to the first cluster of CBSDs;
select from spectrum assigned from the SAS to the first cluster of CBSDs, a first portion of the spectrum to be used by the first CBSD, selecting said first portion including selecting a range of frequencies in the spectrum assigned to the first cluster of CBSDs to be used by the first CBSD;
operate the first CBSD to communicate to a second CBSD in said first cluster of CBSDs information indicating the spectrum allocated to the first cluster of CBSDs and the first portion of said spectrum selected by the first CBSD to be used by the first CBSD; and
operate the first CBSD to use the first portion of the spectrum allocated to the first cluster of CBSDs to communicate with user equipment (UE) devices serviced by the first CBSD.

9. The first CBSD of claim 8, wherein said processor is further configured to:
determine the amount of spectrum needed for the first cluster of CBSDs from an initial first cluster spectrum need determination made by the first CBSD and a cluster spectrum need determination generated by another CBSD in the first cluster of CBSDs and communicated to the first CBSD.

10. A non-transitory computer readable medium including a first set of computer executable instructions which when executed by a processor of a first citizens broadband radio service (CBRS) device (CBSD) cause first CBSD to perform the steps of:
determining the current spectrum needs of the first CBSD based on channel loading;
estimating future spectrum needed by the first CBSD;
communicating one or more of current or future CBRS spectrum need information to other CBSDs;
receiving one or more of current or future CBSD spectrum need information from another CBSD;
determining the amount of spectrum currently needed by a first cluster of CBSDs, said first cluster of CBSDs including multiple CBSDs, said first CBSD being one of the CBSDs in said first cluster of CBSDs;
communicating to a spectrum access system (SAS) information indicating current spectrum needed for the first cluster of CBSDs, said information indicating current spectrum needed for the first cluster of CBSDs being based on said received one or more of current or future CBSD spectrum need information from said another CBSD;

receiving from the SAS a spectrum allocation, said spectrum allocation being an allocation of spectrum assigned to the first cluster of CBSDs;

selecting from spectrum assigned from the SAS to the first cluster of CBSDs, a first portion of the spectrum to be used by the first CBSD, selecting said first portion including selecting a range of frequencies in the spectrum assigned to the first cluster of CBSDs to be used by the first CBSD;

communicating to a second CBSD in said first cluster of CBSDs information indicating the spectrum allocated to the first cluster of CBSDs and the first portion of said spectrum selected by the first CBSD to be used by the first CBSD; and using the first portion of the spectrum allocated to the first cluster of CBSDs to communicate with user equipment (UE) devices serviced by the first CBSD.

* * * * *